(12) United States Patent
Fahner

(10) Patent No.: US 11,250,499 B2
(45) Date of Patent: Feb. 15, 2022

(54) GENERATING OPTIMAL STRATEGY FOR PROVIDING OFFERS

(71) Applicant: FAIR ISAAC CORPORATION, Roseville, MN (US)

(72) Inventor: Gerald Fahner, Austin, TX (US)

(73) Assignee: Fair Isaac Corporation, Roseville, MN (US)

( * ) Notice: Subject to any disclaimer, the term of this patent is extended or adjusted under 35 U.S.C. 154(b) by 521 days.

(21) Appl. No.: 14/808,765

(22) Filed: Jul. 24, 2015

(65) Prior Publication Data
US 2015/0332320 A1 Nov. 19, 2015

Related U.S. Application Data

(63) Continuation of application No. 13/562,230, filed on Jul. 30, 2012, now abandoned.

(60) Provisional application No. 61/513,392, filed on Jul. 29, 2011.

(51) Int. Cl.
*G06Q 30/02* (2012.01)
*G06Q 40/02* (2012.01)

(52) U.S. Cl.
CPC ............ *G06Q 40/02* (2013.01); *G06Q 30/02* (2013.01); *G06Q 30/0254* (2013.01)

(58) Field of Classification Search
CPC ........ G06Q 40/04; G06Q 40/00; G06Q 40/06; G06Q 40/025; G06Q 30/02; G06Q 30/0254
USPC ............................................. 705/35–45, 14
See application file for complete search history.

(56) References Cited

U.S. PATENT DOCUMENTS

| | | | | |
|---|---|---|---|---|
| 7,029,280 B2 * | 4/2006 | Krebs | ................. | G09B 5/00 434/118 |
| 7,908,183 B2 * | 3/2011 | Jacobi | ................. | G06Q 30/0633 705/26.7 |
| 7,970,722 B1 * | 6/2011 | Owen | ................. | G06N 99/005 706/46 |
| 8,108,301 B2 * | 1/2012 | Gupta | ................. | G06Q 20/10 705/38 |

(Continued)

OTHER PUBLICATIONS

Freeman, Linton. "The development of social network analysis." A Study in the Sociology of Science 1 (2004): 687.*

(Continued)

*Primary Examiner* — Kelly S. Campen
(74) *Attorney, Agent, or Firm* — Mintz Levin Cohn Ferris Glovksy and Popeo, P.C.; F. Jason Far-hadian, Esq.

(57) ABSTRACT

Optimal strategies for providing offers to a plurality of customers are generated. A plurality of categorical attributes (for example, gender and residential status) and ordinal attributes (for example, risk score and credit line utilization) can be determined. Values of one of more categorical attributes can be changed as per a transition probability table. Some probabilities can be varied to determine a first tradeoff, based on which a first updated strategy can be generate Further, noise can be added to one or more ordinal attributes. Standard deviation of a noise distribution associated with the noise can be varied so as to determine a second tradeoff, based on which a second updated strategy can be generated. The second updated strategy can be an update of the first updated strategy. Offers can be provided to the plurality of customers in accordance with the second updated strategy.

15 Claims, 17 Drawing Sheets

(56) References Cited

U.S. PATENT DOCUMENTS

| | | | | |
|---|---|---|---|---|
| 8,554,714 B2* | 10/2013 | Raymond | ............... | G06N 5/04 706/47 |
| 2001/0013052 A1* | 8/2001 | Benjamin | ............... | H04L 67/10 709/203 |
| 2001/0014868 A1* | 8/2001 | Herz | ................. | G06Q 10/0637 705/14.38 |
| 2001/0049650 A1* | 12/2001 | Moshal | ................. | G06Q 30/06 705/37 |
| 2006/0179011 A1* | 8/2006 | Latz | .................... | G06Q 50/182 705/309 |
| 2006/0218169 A1* | 9/2006 | Steinberg | ......... | G06F 17/30598 |
| 2007/0011187 A1* | 1/2007 | Chitgupakar | ........... | G06N 3/08 |
| 2007/0011188 A1* | 1/2007 | Chitgupakar | ..... | G06F 17/30539 |
| 2008/0077487 A1* | 3/2008 | Davis | .................... | G06Q 30/02 705/14.25 |
| 2009/0083107 A1* | 3/2009 | Chen-Ritzo | ........... | G06Q 10/04 705/7.12 |
| 2009/0112753 A1* | 4/2009 | Gupta | ................ | G06N 99/005 705/38 |
| 2009/0164274 A1* | 6/2009 | Narayanaswamy | ... | G06Q 10/06 705/70 |
| 2010/0306249 A1* | 12/2010 | Hill | ........................ | G06Q 30/02 707/769 |
| 2013/0030983 A1 | 1/2013 | Fahner | | |
| 2014/0006166 A1* | 1/2014 | Chiang | ............. | G06Q 30/0269 705/14.64 |

OTHER PUBLICATIONS

Vijay S. Desai "Credit Limit Optimization (CLO) for Credit Cards" Sep. 8, 2005, CSCC IX, Edinburgh p. 2.*

Lee et al. "Mining the customer credit using classification and regression tree and multivariate adaptive regression splines" Computational Statistics & Data Analysis, vol. 50, Issue 4, Feb. 24, 2006, pp. 1113-1130 (Year: 2006).*

Fenton et al. "The use of Bayes and causal modelling in decision making, uncertainty and risk" Upgrade, the Journal of CEPIS (Council of European Professional Informatics Societies) Jun. 2, 2011, pp. 1-19 (Year: 2011).*

* cited by examiner

800

| Offers → Customers/Individuals | First offer (A) | Second offer (B) | Third offer (C) | Offer eligibility sets |
|---|---|---|---|---|
| X1 | 1 | 1 | 0 | {A, B} |
| X2 | 0 | 0 | 1 | {C} |
| X3 | 1 | 1 | 1 | {A, B, C} |
| X4 | 1 | 0 | 0 | {A} |
| ... | | | | |

FIG. 8

GENERATING OPTIMAL STRATEGY FOR PROVIDING OFFERS

RELATED APPLICATION

This application is a continuation of U.S. patent application Ser. No. 13/562,230, filed on Jul. 30, 2012, which claims priority to U.S. Provisional Patent Application Serial No. 61/513,392, filed on Jul. 29, 2011, and entitled "Data-Driven Learning Of Utility-Maximizing Customer Treatment Policies," contents of which are incorporated herein by reference in their entireties.

TECHNICAL FIELD

The subject matter described herein relates to generating optimal strategies for providing offers to a plurality of customers.

BACKGROUND

Conventionally, business entities provide offers to customers. For example, banks provide credit line increases to existing credit card customers. Typically, a fixed (that is, not changing with time) strategy, such as a fixed decision tree, is used to decide a credit line increase to a particular customer. Formation of such fixed strategies (for example, fixed credit line increases) can require significant manual expertise from analysts and domain experts, thereby requiring a lot of time, effort, and associated costs.

SUMMARY

The current subject matter describes generating optimal strategies for providing offers to a plurality of customers. In one aspect, data associated with a plurality of individuals can be obtained. Each individual can be associated with a plurality of attributes. Using the obtained data, a best offer for each attribute can be determined. A decision tree characterizing best offers for corresponding attributes can be formed. Performance of the decision tree can be compared with performance of a challenger decision tree to obtain a best performing decision tree. Offers can be provided to the plurality of individuals in accordance with the best performing decision tree.

In some variations, a plurality of possible offers for the plurality of individuals can be determined based on the obtained data. The best offers for each attribute can be selected from the plurality of possible offers.

Using the obtained data, a plurality of causal models can be determined. By joining two or more causal models, a decision model that evaluates one or more objectives of an entity can be formed. The causal model can be used to determine the best offer for each attribute. The causal models can characterize a response of an individual to a historical offer. The determining of the best offer can be based on evaluation of at least one of a global maximum value and a local maximum value by the decision model.

The challenger decision trees can be obtained by changing values of some attributes associated with the decision tree. The performance of the decision tree can be characterized by business efficacy provided by implementing a strategy associated with the decision tree. The business efficacy associated with the decision tree can be based on a plurality of iterations of strategy evolution. The performance of the challenger decision tree can be characterized by business efficacy provided by implementing a strategy associated with the challenger decision tree. The business efficacy associated with the challenger decision tree can be based on a plurality of iterations of strategy evolution. The business efficacy can characterize a profit of an entity providing the offers to the plurality of individuals. The performance of the decision tree can be characterized prior to implementation by expected future business efficacy based on the decision model, and the performance of the challenger decision tree can be characterized prior to implementation by expected future business efficacy based on the decision model. The expected future business efficacy can be simulated based on multiple iterations of future strategy evolution.

In another aspect, a graph characterizing a strategy for providing offers can be obtained. One or more attributes associated with a plurality of individuals can be modified. The one or attributes can be represented by the graph. Based on the modified one or more attributes, an updated strategy for providing offers can be generated.

In some variations, the graph can include a plurality of dots having at least one of a corresponding color and a corresponding intensity. The at least one of the corresponding color and the corresponding intensity can characterize a value of at least one attribute for an associated individual. The offers can be provided to the plurality of individuals. The modifying of the one or more attributes can comprise adding noise to the attributes. The adding of the noise to the attributes can comprise varying a standard deviation of a noise distribution to determine the noise. The adding of the noise to the attributes can provide an optimal profit to an entity providing the offers. The optimal profit can be more than a profit obtained without the addition of the noise.

In yet another aspect, attributes associated with a strategy can be determined. Gaussian noise can be added to one or more attributes. Standard deviation of the Gaussian noise can be varied to determine a tradeoff. An updated strategy associated with the tradeoff can be generated.

In some variations, offers can be provided based on the updated strategy. The updated strategy can be determined based on the tradeoff. The tradeoff can characterize a balance between cost of a business entity and rate of update of strategies.

In a further aspect, a plurality of attributes associated with a strategy can be determined. Values of a first set of one or more attributes can be changed in accordance with a transition probability table. One or more probabilities can be varied to determine a first tradeoff. Based on the first tradeoff, a first updated strategy can be generated.

In some variations, noise can be added to a second set of one or more attributes. Standard deviation of a noise distribution associated with the noise can be varied to determine a second tradeoff. Based on the second tradeoff, a second updated strategy can be generated. The second updated strategy can characterize an update of the first updated strategy. Based on the second updated strategy, offers can be provided to a plurality of individuals. The first set of one or more attributes can include gender and residential status. The second set of one or more attributes can include risk score and credit line utilization.

Further, from a table, eligibility constraints can be determined for provision of one or more offers to one or more customers. The first updated strategy and the second updated strategy can be based on the eligibility constraints to exclude provision of some offers to corresponding ineligible customers.

The first tradeoff and the second tradeoff can be determined using corresponding tradeoff curves. Each tradeoff can be characterized by a sweet-spot on a corresponding tradeoff curve. The sweet-spot can characterize a position where generated strategy data can be more than a first threshold while profit can be more than a second threshold.

Non-transitory computer program products are also described that comprise instructions, which, when executed by one or more data processors, causes at least one data processor to perform operations herein. Similarly, computer systems are also described that may include a processor and a memory coupled to the processor. The memory may temporarily or permanently store one or more programs that cause the processor to perform one or more of the operations described herein. Methods can be implemented by one or more data processors forming part of one or more computing systems.

The subject matter described herein provides many advantages. For example, using the current subject matter, generating strategies to provide offers to customers can require minimal, negligible or no manual expertise by analysts and domain experts, thereby requiring less time, effort, and associated costs. Further, the effectiveness of a strategy can be shown, for a better visual analysis of the strategy, on a graph (or other model) displayed on a graphic user interface. This effectiveness of the strategy can be changed by varying at least one statistical parameter, such as standard deviation, so as to generate a most optimal strategy that can provide maximum business efficacy. Champion-challenger techniques can also be implemented in some other implementations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a table illustrating offer eligibilities of a plurality of customers;

Like reference symbols in the various drawings indicate like elements.

DETAILED DESCRIPTION

The current subject matter relates to generating optimal strategies for providing offers to a plurality of customers. The strategies can be illustrated using strategy tools, such as decision trees. While decision trees have been described herein, other strategy tools can also be used, such as one or more of the following: decision tables, flow-charts, if-then-else analyses, switch-case analyses, what-if analyses, influence diagrams, Markov chains, odds algorithms, truth tables, and any other tool.

In an example of credit card limit management, an offer can be an increase in credit card limit associated with a customer. A first customer, which has a very low credit bureau score (that is, high likelihood of defaulting in the near future), may not be provided an offer or increase in credit limit. A second customer, which has a higher credit score and uses the credit score once in a while for minor purchases, can be provided a small (for example, $100-$500) increase in credit card limit. A third customer, which has a very high risk score and has account balance close to current limit, can be provided a large (for example, $1000-$10000) increase in credit card limit. Such a differentiation in provision of offers can be advantageous for a lender that may want to maximize revenue (for example, through card interest or interchange fees) while limiting exposure and delinquencies.

Furthermore, in an example of retail coupon marketing, an offer can be a discount coupon associated with a purchase of one or more items, such as retail products. A loyal customer that may be expected to be price-sensitive can be offered a discount coupon for purchasing a higher-priced brand, whereas another customer that is expected to be less price-sensitive may not be offered the discount. Price-sensitivity can be inferred from historic purchase transactions (of associated customer) that can reveal strong preferences for discounted products. Such a differentiation in provision of offers can be advantageous for a retailer that may want to reward loyalty and increase sales revenue, or can be advantageous for a manufacturer that may want to increase market share.

Figure 1A:
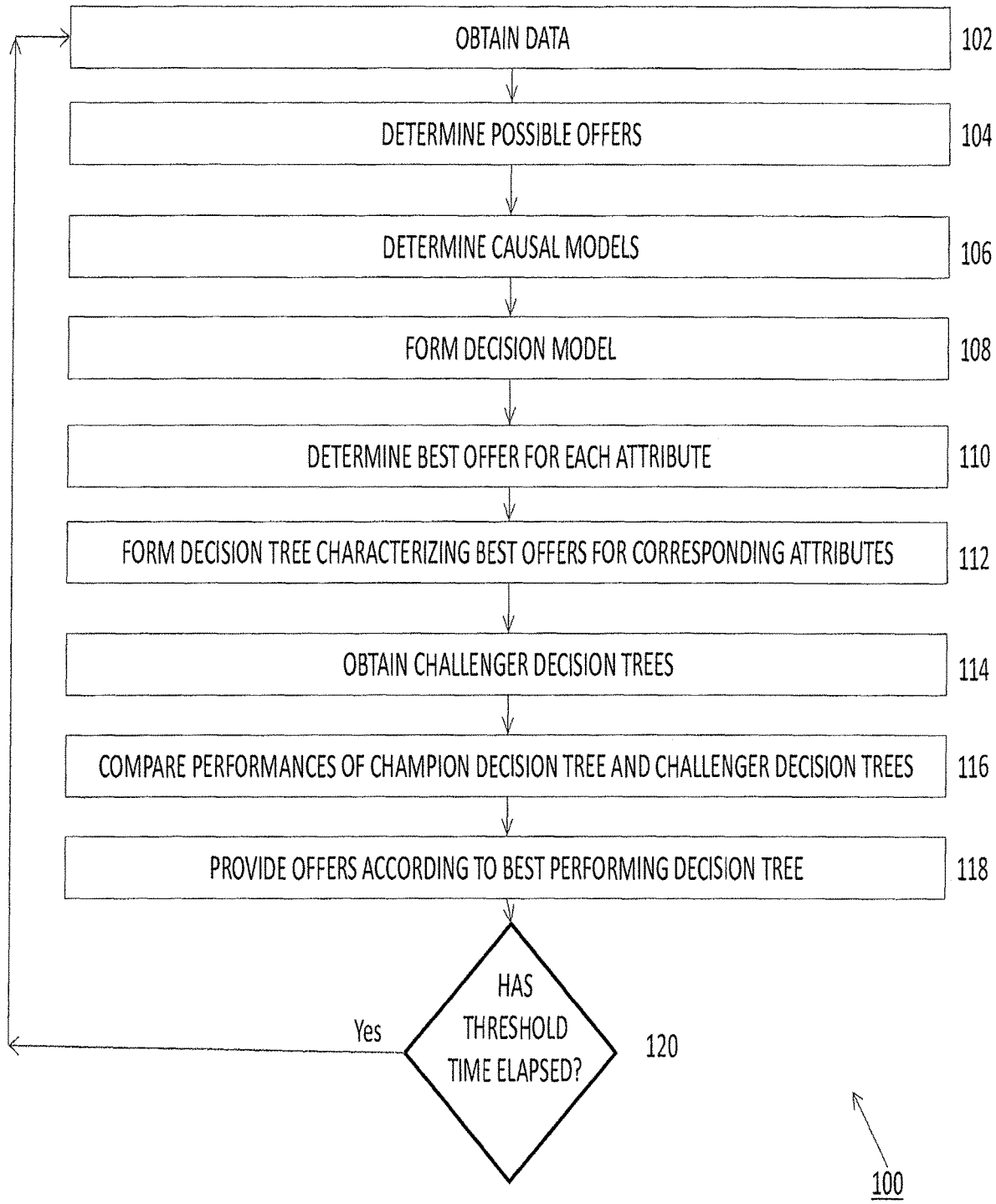
FIG. 1A is a first flowchart illustrating an ongoing provision of optimal offers to a plurality of customers.

FIG. 1A is a first flowchart 100 illustrating an ongoing provision of optimal offers to a plurality of customers. The provision can result in a currently most optimal utilization of resources of an entity. The most optimal utilization of resources can include less manual work, less effort, less time, less cost, higher profit, less computing requirements, less storage requirements, and optimal use of other business resources.

Data can be obtained, at 102, for a plurality of customers. The data can include historic information associated with various attributes of customers. The attributes can include observed variables that can be known at the time of provision of offers, such observed variables including: information filled by customers in applications, information regarding financial-accounts, demographics, transaction data, credit bureau data, credit card score, credit card usage data, risk score, revenue score, credit line utilization data, social network data, conversations/messages of one or more customers with other customers or third parties, third party data, and any other observed variable. Further, the attributes can include derived or inferred variables, such derived variables including: text keywords, n-grams, merger and acquisition transaction data, parameters of social networks such as connectedness (for example, roll-up activity), and any other derived variable. Furthermore, the attributes can include forward-looking predictive variables and score that can be computed based on the observed variables, the predictive variables including: likelihood to default over a particular (for example, predetermined) period of time in future (for example, two years), expected customer lifetime value, and any other predictive variable.

The obtained data can be used to determine, at 104, various offers that can be provided to a customer. The various offers can include various increases in credit limit for a customer. For example, different credit line increases can be at least some of: $0 (that is, no increase), $500, $1000, $2500, $5000, $10000, $50000, and any other credit line increase. The determining of offers can be determined automatically by performing regression analyses on the obtained data. Although an automatic determining of offers is described, in other implementations, manual determining of offers can also be possible.

Using the obtained data, causal models can be determined, at 106. Using the causal models, effects of actions on outcomes can be inferred from the obtained data. Thus, the causal models are also referred to herein as action-effect models. A causal model can characterize a response function, such as: "function (attribute, historical-offer)=Outcome subsequent to the historical-offer." In one example, the historical-offer can be an offer, and the outcome can be either an acceptance or denial of the offer by the customer. In another example, the historical-offer can be an offer for a $500 increase in credit limit, and the outcome can be one or more of subsequent credit card balances, delinquencies, losses, and any other outcome. The causal models can be developed either for each outcome or for selective outcomes. Such a development of causal models can be performed using regression modeling. Extrapolation risk can be removed-from or minimized-in the causal models, as described further below.

Two or more causal models can be joined/tied together to form, at 108, a decision model. The decision model can evaluate business objectives of an entity, such as a business entity. The business objectives can characterize business metrics, such as cost, profits, loss, sales volume, revenue, and any other business metric. The decision model can characterize business efficacy, which can be defined by the following exemplary equation: "Efficacy(attribute, offer)=a*M1(attribute,offer)+b*M2(attribute,offer)," wherein Efficacy can be business efficacy, M1 can be a first business metric, M2 can be a second business metric, and a and b can characterize constraints associated with corresponding business metrics. While the business efficacy equation has been described as being dependent on two business metrics M1 and M2, in other implementations, more than two (for example, three, five, ten, twenty, hundred, five hundred, or any other finite number, as appropriate) metrics can be used.

A best offer for each attribute can be determined, at 110, by using the decision model. More specifically, the best offer can be determined using the business efficacy equation, which is described above as: "Efficacy(attribute, offer)=a*M1(attribute, offer)+b*M2(attribute, offer)," wherein Efficacy can be business efficacy, M1 can be a first business metric, M2 can be a second business metric, and a and b can characterize constraints associated with corresponding business metrics. The best offer for an attribute can be one that maximizes business efficacy. That is, the best offer for a particular attribute can be the value of offer that can maximize the business efficacy equation: "Efficacy (attribute, offer)=a*M1(attribute, offer)+b*M2(attribute, offer)." The obtained maximum can be a global maximum. Although use of a global maximum is described, in some other implementations, the obtained maximum can be a local maximum. Accordingly, the best offer can be characterized by the following mathematical equation: "$Offer^{Best}$ (Attribute)=argmax {Efficacy(attribute, offer)}," wherein $Offer^{Best}$ (Attribute) can be the best offer for a particular attribute, and argmax can characterize argument of the maximum.

The determined best offers for corresponding attributes can be used to form, at 112, a decision tree. This decision tree can be called a champion decision tree. A decision tree can be a graph or a model that can characterize decisions and their possible consequences, such as chance outcomes, resource costs, efficacy, and the like. A decision tree can characterize an algorithm associated with a model.

Challenger decision trees can be obtained, at 114. The challenger decision trees can be obtained by changing some values in a champion decision tree. For example, a challenger tree can be constructed by changing some of the actions (offers) in the leaf nodes as determined by a user. Alternately, a challenger can be constructed by changing some of the split values to different values as determined by a user.

Performances of the champion decision tree and the challenger decision trees are compared, at 116. More specifically, the decision tree, provision of offers according to which can provide maximum business efficacy/advantages, can be determined.

Offers can be provided, at 118, in accordance with the best performing tree. In a first iteration, the champion decision tree can usually have the best performance. That is, in the first iteration, the provision of offers in accordance with the champion decision tree can provide most business efficacy than provision of offers in accordance with any challenger decision tree. In subsequent iterations, if a challenger decision tree challenges the champion decision tree and becomes the champion decision tree, the new champion decision tree (previously challenger decision tree) can provide more business efficacy.

The offers can be provided to virtual customers in iterations until a most optimal strategy (for example, the most optimal decision tree that can provide optimal business efficacy) is obtained. After the most optimal strategy is obtained, the offers can be provided to real customers.

It can be determined, at 120, whether a threshold time has elapsed/passed since the provision of offers according to a best performing decision tree. The particular (for example, predetermined) time can be 5 minutes, 10 minutes, 1 hour, 2 hours, 10 hours, 1 day, 2 days, 10 days, 20 days, 3 months, or any other time. A new action may not be performed until the particular (for example, predetermined) time has elapsed/passed. When the particular (for example, predetermined) time has elapsed, one or more (or all) of 102, 104, 106, 108, 110, 112, 114, 116, 118, and 120 can be re-performed such that the most current data can be used to provide optimal offers to customers.

Figure 1B:
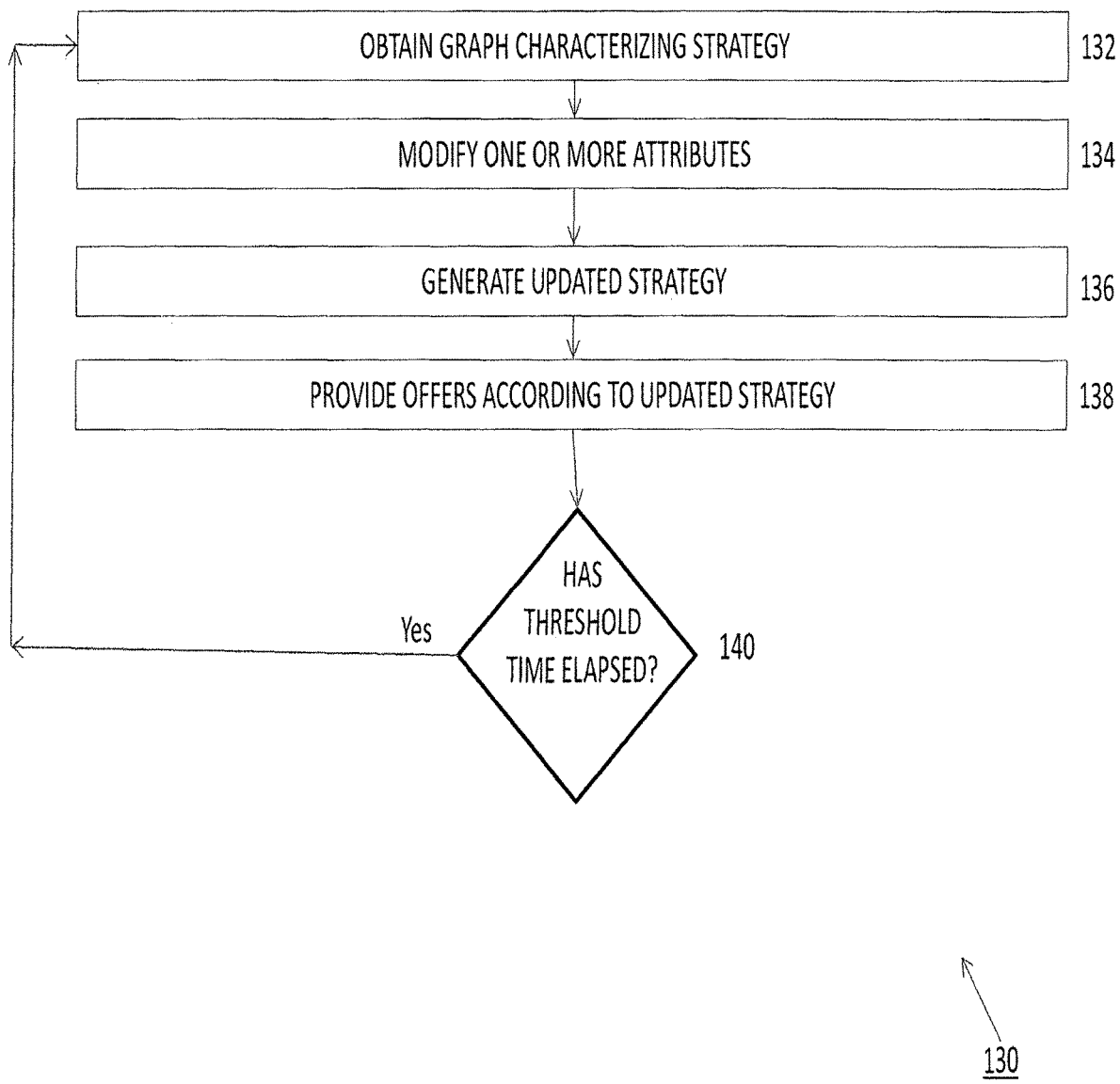
FIG. 1B is a second flowchart illustrating an ongoing provision of optimal offers to a plurality of customers.

FIG. 1B is a second flowchart 130 illustrating an ongoing provision of optimal offers to a plurality of customers. A graph can be obtained at 130. The graph can characterize a strategy of providing offers to a plurality of customers. The graph can show values of different attributes, such as risk score and credit line utilization. One or more attributes (for example, risk score and credit line utilization) can be modified at 134. The modification can include addition of noise to each attribute. The noise can be Gaussian noise. Standard deviation of the Gaussian noise can be varied to determine a most optimal standard deviation that can be used to provide most business efficacy (for example, profit of an entity providing the offers). An updated strategy to provide offers can be generated, at 136, based on the modified one or more attributes. Offers can be provided, at 138, based on the updated strategy. The offers can be provided to virtual customers in iterations until a most optimal strategy (for example, the most optimal decision tree that can provide optimal business efficacy) is obtained. After the most optimal strategy is obtained, the offers can be provided to real customers. It can be determined, at 140, if a threshold time has elapsed. If the threshold time has elapsed, 132, 134, 136, 138, and 140 can be re-performed. If the threshold time has not elapsed, new action may not be performed.

Figure 1C:
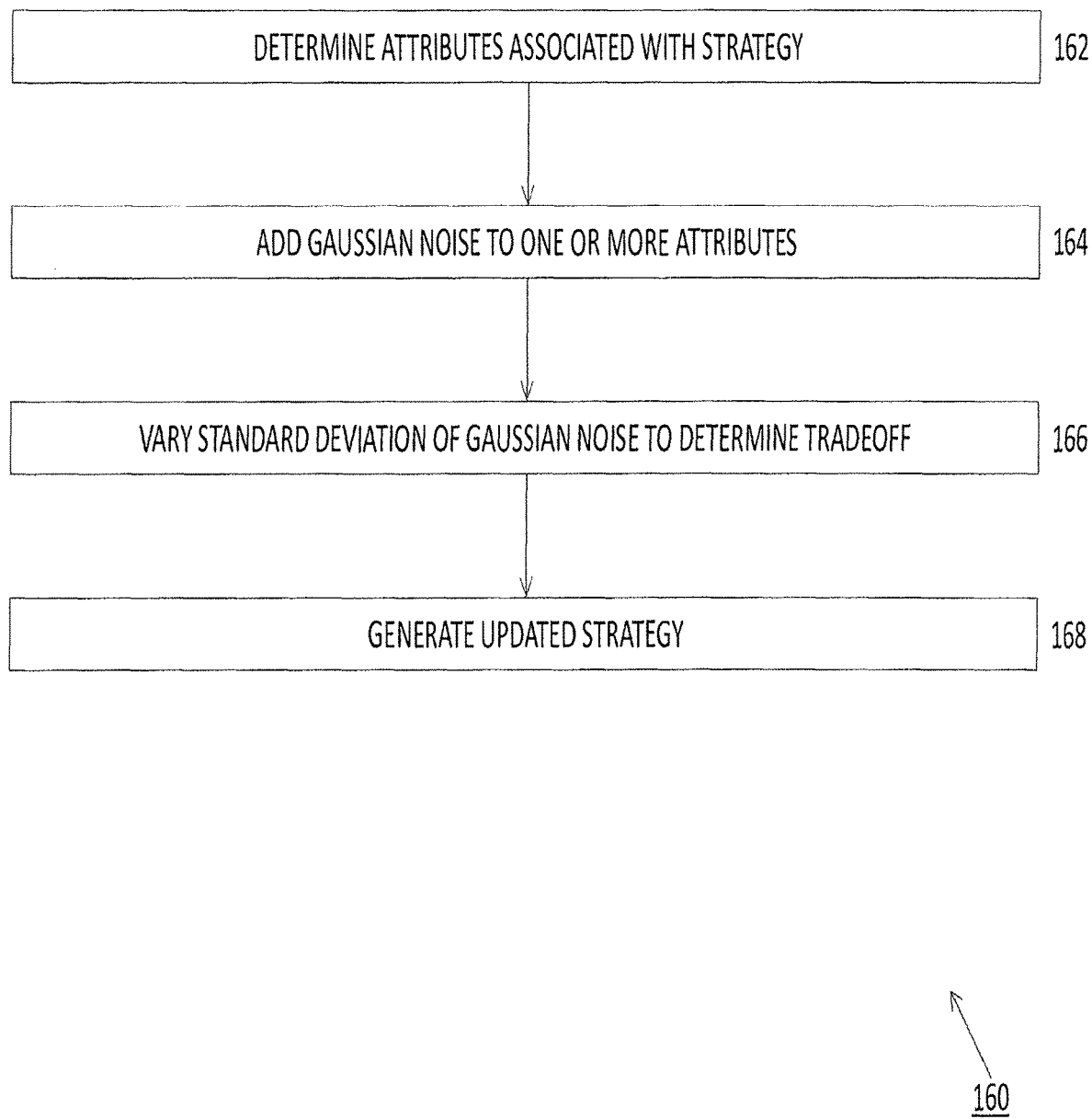
FIG. 1C is a third flowchart illustrating an ongoing provision of optimal offers to a plurality of customers.

FIG. 1C is a third flowchart 160 illustrating an ongoing provision of optimal offers to a plurality of customers. Attributes associated with a strategy for providing offers to a plurality of customers can be determined at 162. The attributes can be risk score, credit line utilization, and the like. Gaussian noise with an associated Gaussian distribution can be added, at 164, to one or more attributes (in some implementations, all attributes). Standard deviation of the Gaussian noise associated with each attribute can be varied, at 166, to determine an exploration-exploitation tradeoff. An updated strategy can be generated, at 168, based on the exploration-exploitation tradeoff. The exploration-exploitation tradeoff can maintain a balance between aggressiveness (so as to learn as much and as fast as possible) and timidness (so as to keep testing costs under control). Based on the updated strategy, offers can be provided to customers. The offers can be provided to virtual customers in iterations until a most optimal strategy (for example, the most optimal decision tree that can provide optimal business efficacy) is obtained. After the most optimal strategy is obtained, the offers can be provided to real customers.

Figure 1D:
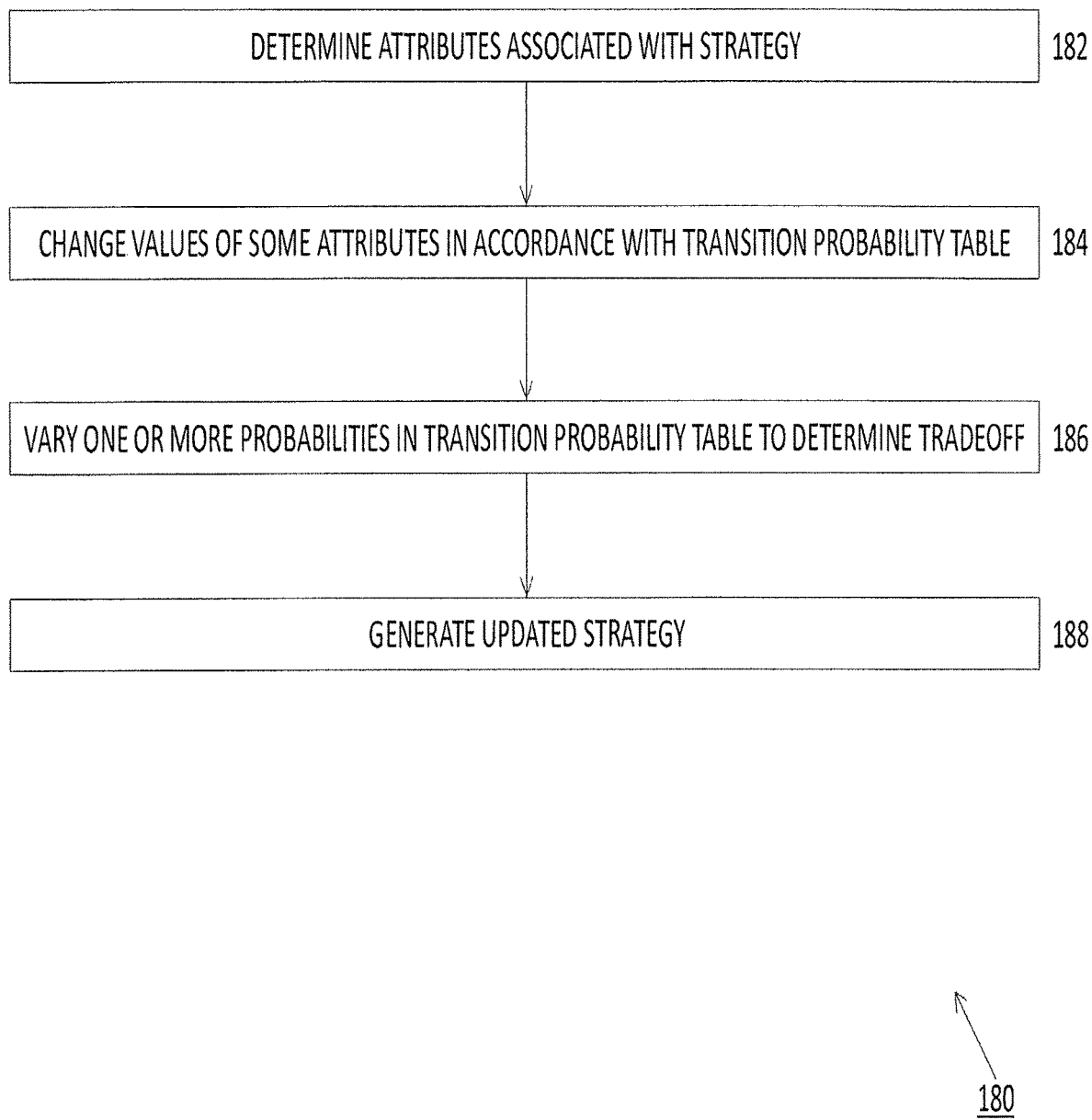
FIG. 1D is a fourth flowchart illustrating an ongoing provision of optimal offers to a plurality of customers.

FIG. 1D is a fourth flowchart 180 illustrating an ongoing provision of optimal offers to a plurality of customers. Attributes associated with a strategy for providing offers to a plurality of customers can be determined at 182. The attributes can be categorical attributes, such as gender, residential status, and the like. Values of some attributes can be changed, at 184, with some probability in accordance with a transition probability table. The transition probability table can be accessed either via wires or wirelessly over a network. One or more probabilities in the transition probability table can be varied, at 186, to determine a tradeoff. The tradeoff can be used to generate, at 188, an updated strategy that can be more optimal than the strategy in the previous iteration. The tradeoff can maintain a balance between a fast and adequate learning and a high cost. Based on the updated strategy, offers can be provided to customers. The offers can be provided to virtual customers in iterations until a most optimal strategy (for example, the most optimal decision tree that can provide optimal business efficacy) is obtained. After the most optimal strategy is obtained, the offers can be provided to real customers.

Figure 2:
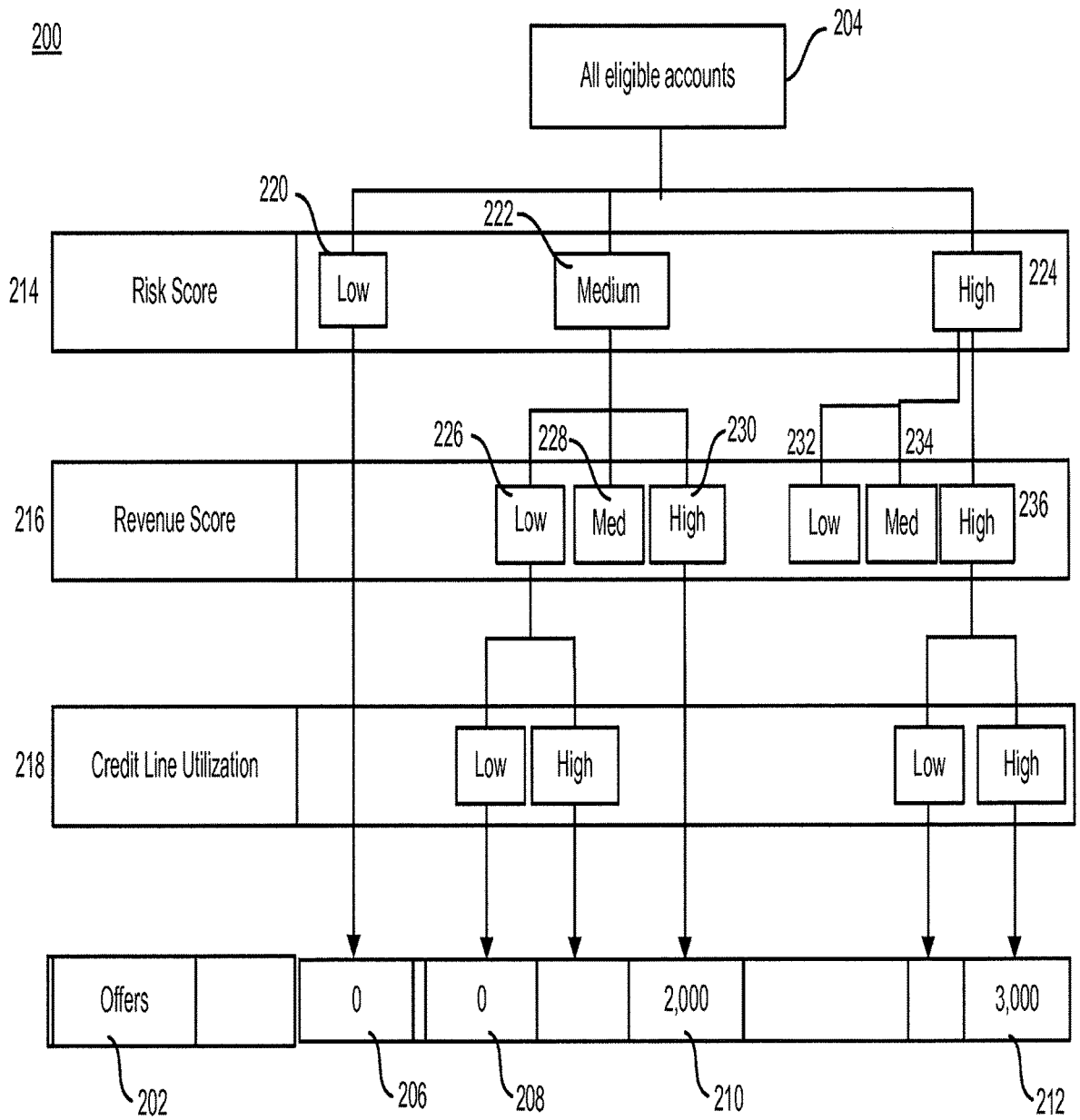
FIG. 2 is a diagram illustrating a decision tree.

FIG. 2 is a diagram illustrating a decision tree 200 in accordance with some implementations of the current subject matter. The decision tree 200 can characterize a strategy for providing offers 202 to a plurality of customers. The offers 202 can be increases in credit limit for selective (for example, all eligible) accounts 204 of one or more customers of the plurality of customers. The offers 202 can be increases in credit limit of $ zero (that is, no increase) 206, $ zero (that is, no increase) 208, $ two-thousand 210, and $ three-thousand 212.

Each customer can be associated with at least the following attributes: risk score 214, revenue score 216, and credit line utilization 218.

The risk score 214 can be one of low 220, medium 222, and high 224. The differentiation between low 220, medium 222, and high 224 risk scores can be based on corresponding split values. For example, the risk score 214 can be from 1 to 100, and the split values can be thirty-three and sixty-six so as to classify a particular risk score 214 as one of low 220, medium 222, and high 224. If the risk score 214 is low, no offer may be made regardless of values of revenue score 216 and credit line utilization 218.

If the risk score 214 is medium, the revenue score 216 can be classified into low 226, medium 228, and high 230. The revenue score 216 can be classified into low 226, medium 228, and high 230 based on corresponding split values. When the risk score 214 is medium 222 and the revenue score is high 230, the offer can be $ two-thousand 210 increase in credit limit. If the risk score 214 is high 224, the revenue score 216 can be classified into low 232, medium 234, and high 236. This classification of the revenue score 216 can be based on corresponding split values.

In one implementation, the split values associated with low 226, medium 228, and high 230 revenue scores can be same as split values associated with low 232, medium 234, and high 236 revenue scores. In other implementations, the split values associated with low 226, medium 228, and high 230 revenue scores can be different from split values associated with low 232, medium 234, and high 236 revenue scores. Similar splits and corresponding offers can be made in the decision tree 200, as shown.

All (or most) of the attributes 214, 216, and 218, and associated split values can be determined from the historic data obtained at 102. In other implementations, the attributes 214, 216, and 218, and/or the split values can be specified by a designer.

Figure 3:
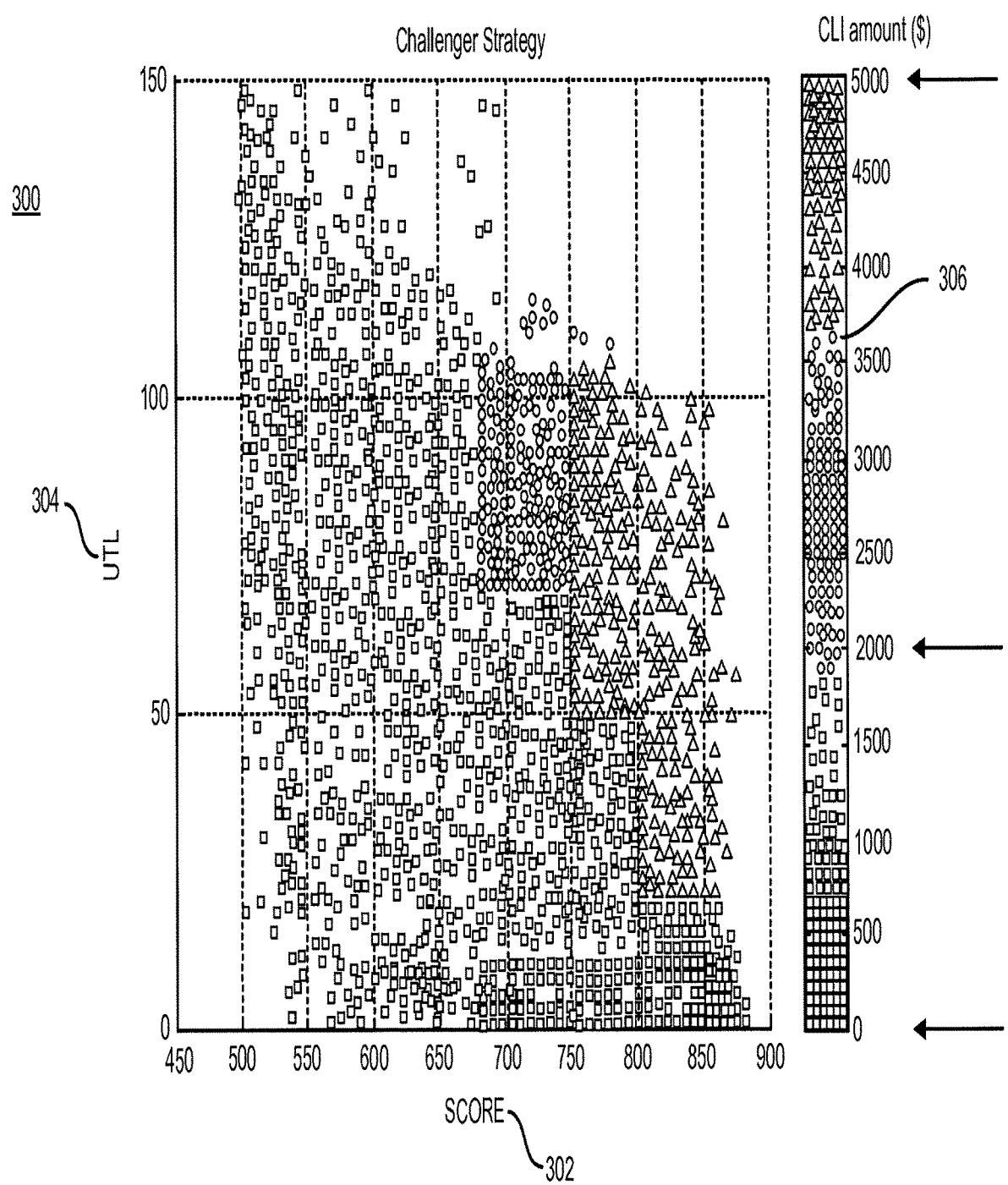
FIG. 3 is a plot illustrating an offer provided to each customer associated with attributes risk score and credit line utilization, in accordance with a champion strategy of providing offers.

FIG. 3 is a plot 300 illustrating an offer (for example, credit line increase (CLI)) provided to each customer that is associated with attributes risk score 302 and credit line utilization 304, in accordance with a champion strategy of providing offers. Each dot in the plot 300 can characterize a customer. At least one of color and intensity of the dot can characterize offer (for example, credit line increase) provided to the customer. The offer can be provided in accordance with the strategy characterized by a champion decision tree, such as the decision tree 200. A scale 306 can characterize the quantitative numerical value of the offer associated with a corresponding color or intensity. The scale 306 can display a continuous range of colors and/or intensities. Thus, the scale 306 can be used to infer the numerical value of the offer provided to a customer associated with a particular color or intensity.

The strategy associated with plot 300 can provide, among other offers, offers of $ zero (that is, no increase in credit limit), $ two-thousand, and $ five-thousand. The highest offers can be provided to customers with moderate to high risk scores 302, and with moderate credit line utilizations 304. For example, the highest offers (for example, increases of credit limits by $ five-thousand or about $ five-thousand) can be provided to customers with risk scores 302 being more than seven-hundred-and-fifty, and with credit utilizations 304 between twenty and hundred. Medium offers can be provided to customers with medium risk scores 302 and high credit line utilizations 304. For example, medium offers (for example, increases of credit limits by $ two-thousand or about $ two-thousand) can be provided to customers with risk scores 302 between six-hundred-and-eighty and seven-hundred-and-fifty, and with credit line utilizations 304 between seventy and hundred. No offers may be provided (that is, credit limit is not increased) to most of the other customers, as shown.

The plot 300 includes some common regions where some customers receive a first offer (for example, increases of credit limits by $ five-thousand) whereas other customers receive a second offer (for example, increases of credit limits by $ two-thousand). For example, consider the regions in plot 300 where credit utilization 304 is fifty and risk score 302 is between seven-hundred-and-fifty and eight-hundred. Within these common regions, customers with similar values of attributes can receive different offers.

The common regions are also referred to, herein, as common support regions.

Figure 4:
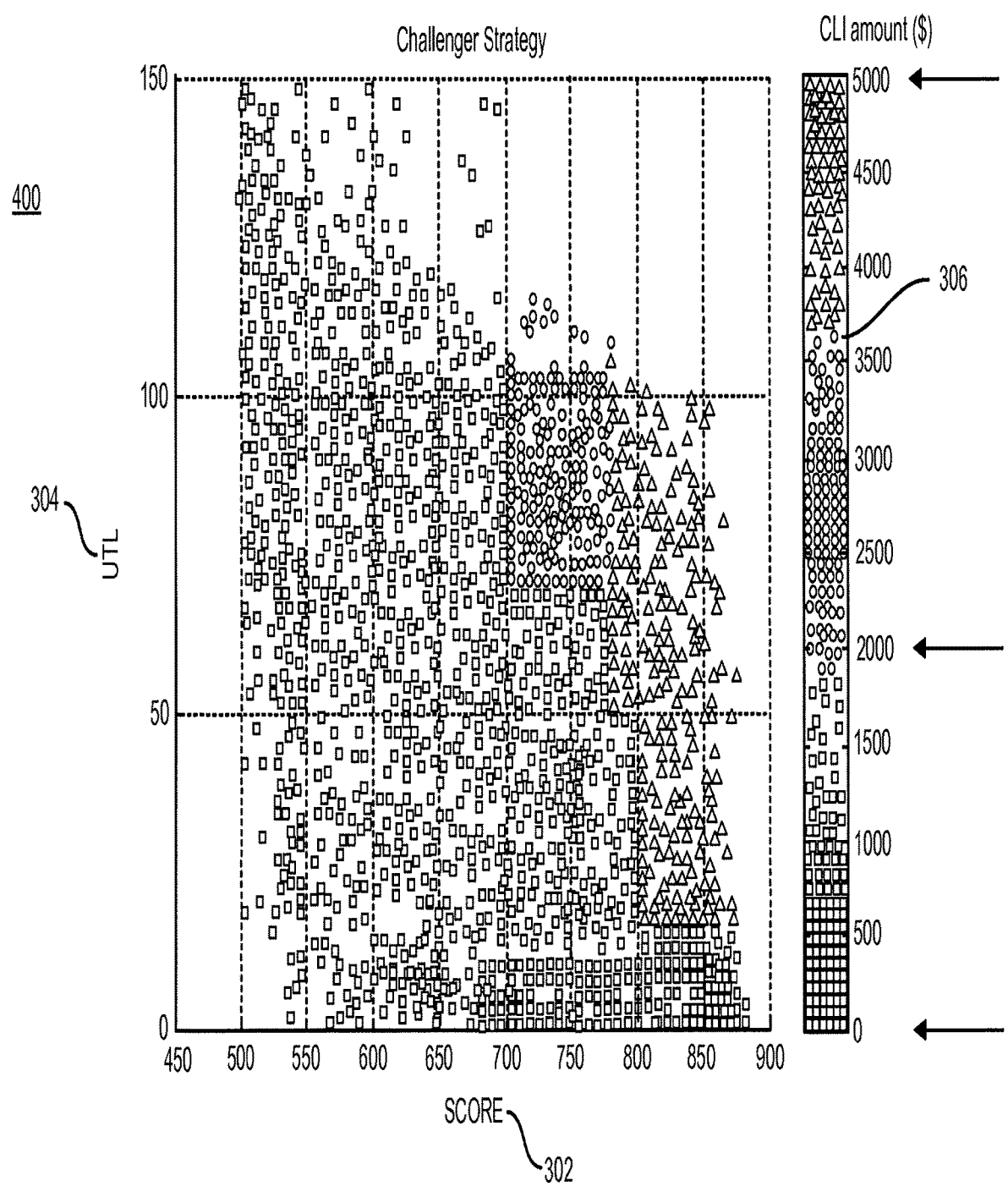
FIG. 4 is a plot illustrating an offer provided to each customer associated with attributes risk score and credit line utilization, in accordance with a challenger strategy of providing offers.

FIG. 4 is a plot 400 illustrating an offer (for example, credit line increase (CLI)) provided to each customer that is associated with attributes risk score 302 and credit line utilization 304, in accordance with a challenger strategy of providing offers. As shown, the regions associated with different offers can be defined differently in plot 400 from those in plot 300. For example, the challenger strategy can require a risk score 302 of at least seven-hundred-and-eighty for a customer to receive the highest offer, whereas the champion strategy of plot 300 requires a risk score 302 of seven-hundred-and-fifty for a customer to receive the highest offer.

The plot 400 can also include common support regions, as shown.

Common support regions in plots 300 and 400 can be common regions where some customers receive a first offer (for example, increases of credit limits by $ five-thousand) whereas other customers receive a second offer (for example, increases of credit limits by $ two-thousand). Thus, alternate offers can be tested on some customers in these common regions so as to maintain or increase the business efficacy of the business entity providing these offers. In non common-support regions (that is, regions that may not have common support), the outcomes from alternative offers can be unknown, and therefore extending alternative offers to customers in these non common-support regions can carry higher risks, which a risk-averse business may want to avoid. Thus, it can be advantageous to have/implement strategies with more (for example, more in area/size) common-support regions.

Figure 5:
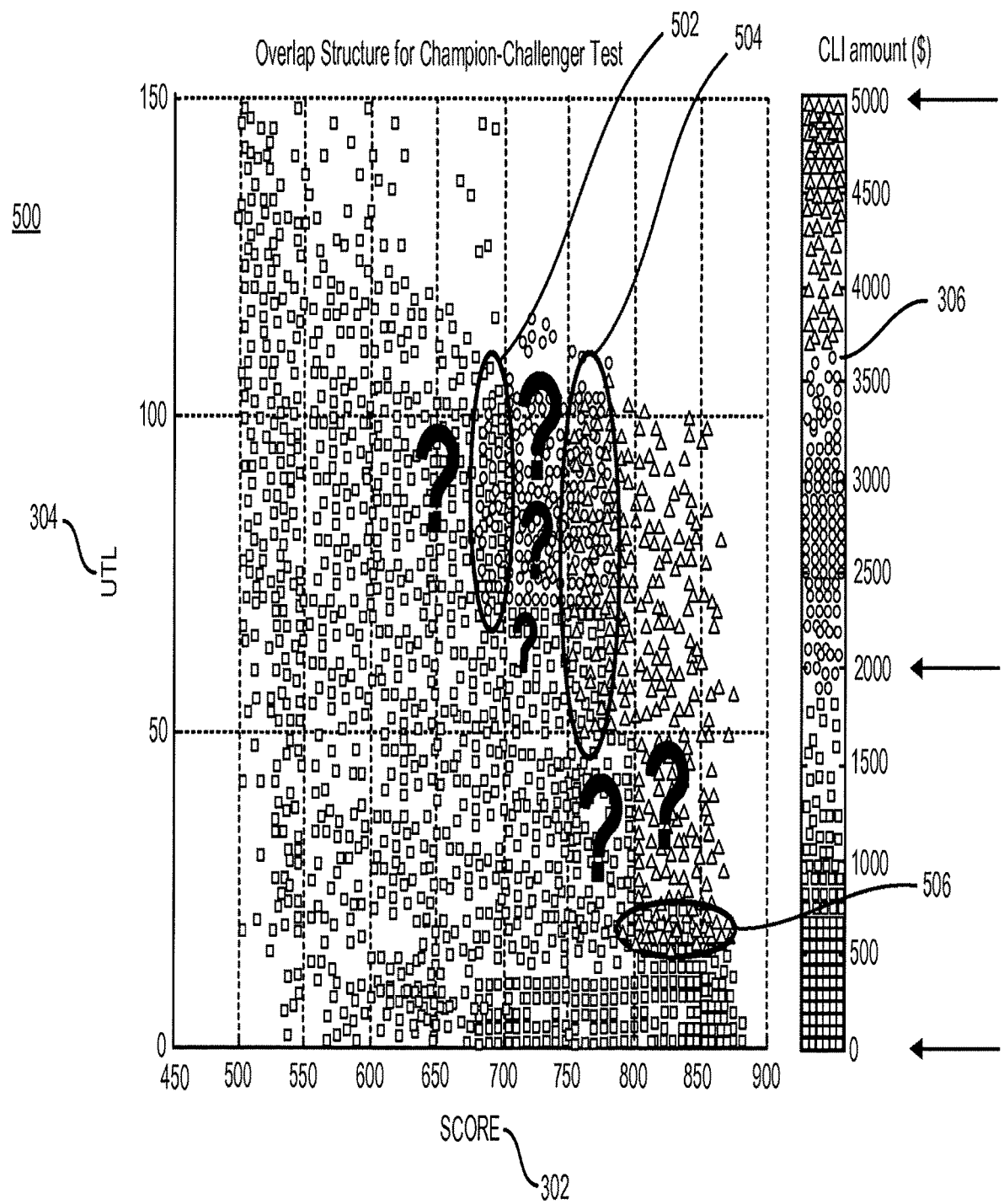
FIG. 5 is a plot illustrating an offer provided to each customer associated with attributes risk score and credit line utilization, in accordance with a champion-challenger test that can provide more common-support regions.

FIG. 5 is a plot 500 illustrating an offer (for example, credit line increase (CLI)) provided to each customer that is associated with attributes risk score 302 and credit line utilization 304, in accordance with a champion-challenger test that can provide more (for example, more in area/size) common-support regions than those in plots 300 and 400. In the champion-challenger test, each customer can be assigned to either the champion strategy of plot 300 or the challenger strategy of plot 400. The probability for assignment to the champion strategy can be same as the probability for assignment to the challenger strategy. Such an assignment of customers can produce the plot 500, where the common support regions can be more in area/size than area/size of those in plots 300 and 400. Such common support regions are illustrated by enclosing those regions by corresponding ellipses 502, 504, and 506. Non common-support regions (that is, regions that may not have common support) are illustrated by showing question-marks in those regions.

As noted above, alternate offers can be tested on some customers in the common regions enclosed by ellipses 502, 504, and 506 so as to maintain or increase the business efficacy of the business entity providing offers. In non common-support regions (for example, regions that may not have common support), extending alternative offers to customers in these non common-support regions can carry higher risks, which a risk-averse business may want to avoid. Such a testing of alternate offers in selective regions (for example, common support regions) of a plot can advantageously maintain or improve/increase business efficacy by reducing or eliminating the risk of manual judgments associated with extrapolating effect of alternate offers in the non common-support regions.

Figure 6:
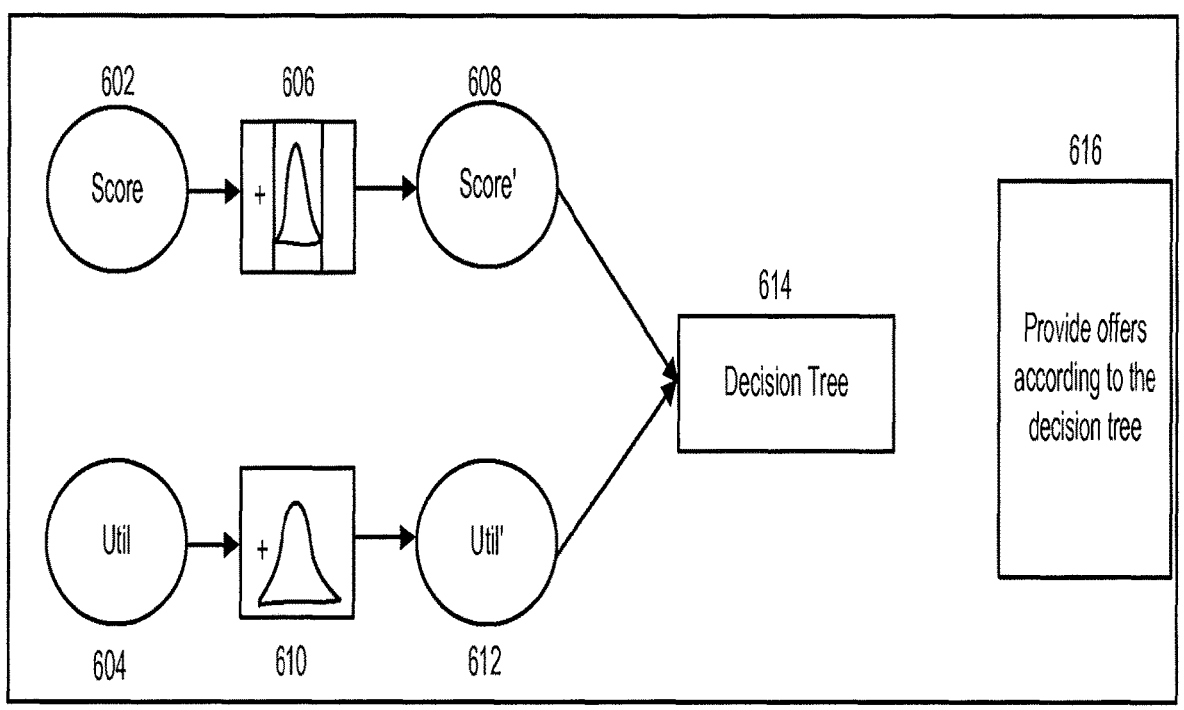
FIG. 6 is a diagram illustrating a system for varying attributes in a controlled manner so as to control the area of common support regions in a plot associated with those attributes.

FIG. 6 is a diagram illustrating a system 600 (and associated technique) for varying attributes in a controlled manner so as to control the area of common support regions in a plot associated with those attributes. The system 600 can receive attributes risk score 602 and credit line utilization 604 from obtained historic data, as in 102. A noise generator 606 can add noise to the attribute risk score 602 so as to obtain a modified risk score 608. A noise generator 610 can add noise to the attribute credit line utilization 604 so as to obtain a modified credit line utilization 612. The modified risk score 608 and the modified credit line utilization 604 can be used to form a decision tree 614. Offers can be provided, at 616, to a plurality of customers according to the decision tree 614.

The noise added to the attributes risk score 602 and credit line utilization 604 can be Gaussian noise that can have a Gaussian distribution associated with a mean and a standard distribution. To vary the noise added, the mean and the standard distribution can be varied by a designer in a controlled manner. The standard deviation can be a parameter that can control the spread of noise. Also, the area of common-support region can be directly proportional to the standard deviation (that is, higher the standard deviation, more the common-support region). So, in some implementations, the mean can be set to zero, and the standard deviation can be varied until a decision-tree and associated plot with sufficient common support are obtained. Increasing the standard deviation by a significant amount (for example, more than a predetermined threshold) can reduce business efficacy—so, a balance can be obtained to provide high (for example, more than a threshold) common-support area paired with high business efficacy.

While examples of Gaussian noise have been described, other noises that can have a distribution can also be used, such as Bayesian noise, Poisson noise, Cauchy noise, Brownian noise, and any other noise that can have a distribution. The distributions of these noises can be controlled using one or more statistical parameters, such as standard deviation.

Figure 7:
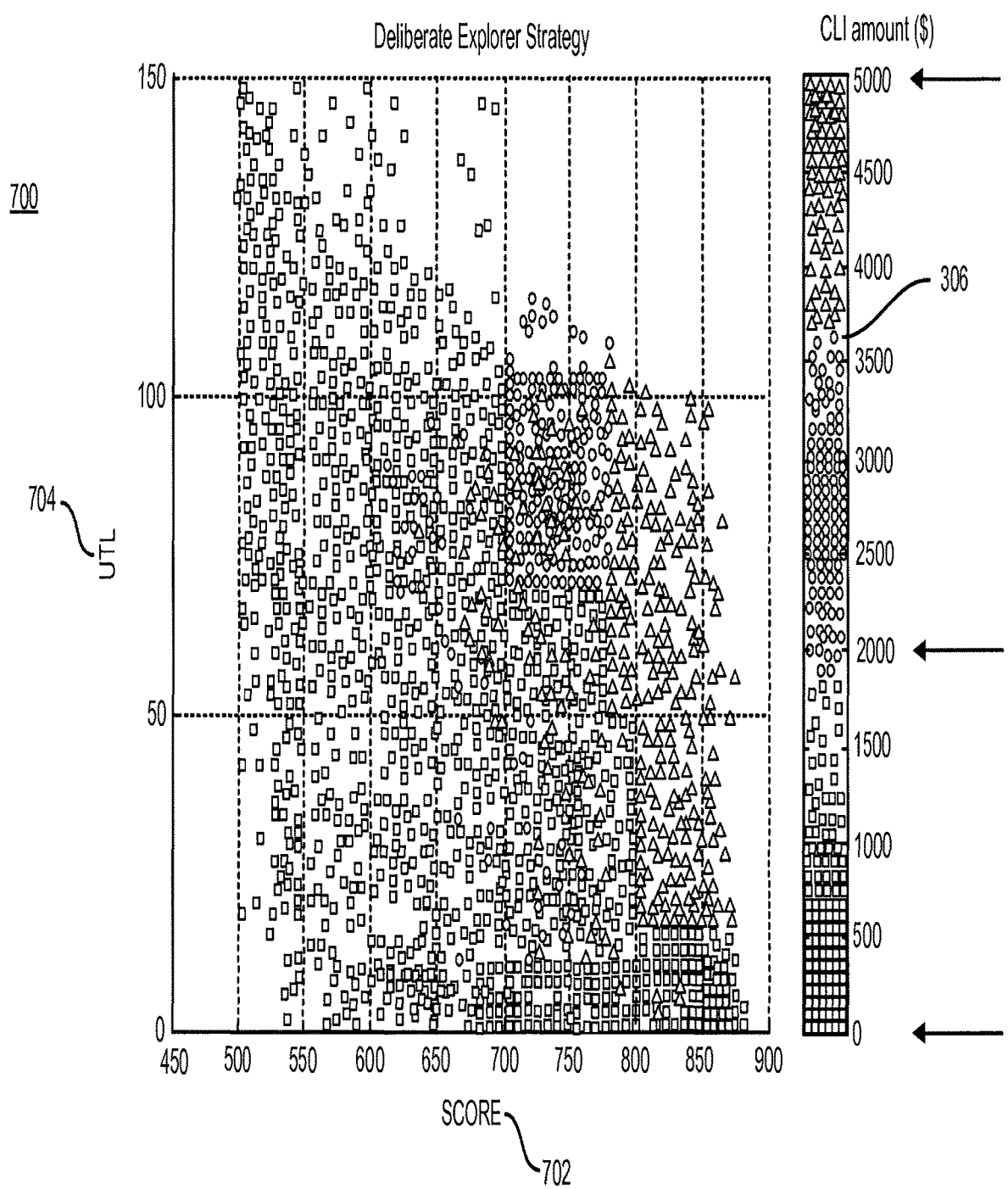
FIG. 7 is a plot illustrating an offer provided to each customer associated with attributes modified risk score and modified credit line utilization that can provide even more and better controlled common support regions than those with respect to FIG. 5.

FIG. 7 is a plot 700 illustrating an offer (for example, credit line increase (CLI)) provided to each customer that is associated with attributes modified risk score 702 and modified credit line utilization 704 that can provide even more and better controlled common support regions than those with respect to FIG. 5. The modified risk score 702 can be obtained by adding, by noise generator 606, noise in a controlled manner (for example, by varying standard deviation of the noise distribution) to the risk score 302. The modified credit line utilization 704 can be obtained by adding, by noise generator 610, noise in a controlled manner (for example, by varying standard deviation of the noise distribution) to the credit line utilization 304. As shown, area of the common support region in plot 700 can be significantly more than the common support regions in plots 300 and 400, or even 500.

In some other implementations, the attributes can be such that addition of noise may not be appropriate. For example, when the attributes can be categorical attributes such as gender and residential status, the addition of noise to these attributes may not be appropriate. In such cases, a methodology that can be an alternate of the noise-addition methodology can be implemented. In this alternate methodology, values of such categorical attributes can be randomly changed/flipped according to a table, such as a transition probability table. For example, if value of attribute residential status is "lives with parents," then this value can be changed/flipped with 20% probability to the value "renter," and vice versa, in accordance with the transition probability table provided by the designer. Further, if value of the attribute gender is "male," then this value can be changed/flipped with 10% probability to "female," and vice versa, in accordance with the transition probability table provided by the designer. Thus, while the test designer can provide a value of standard deviation to control addition of noise in some other implementations described herein, here, the test designer can provide the transition probability table.

In some implementations, the probabilities associated with the transition probability table can be uniform so that each value of each categorical attribute can be equally likely be flipped to any other value. In other implementations, the probabilities can be chosen such that certain value flips can be more likely than others, especially when there may be a sense of closeness of values of the attributes. For example, customers that live with their parents can be regarded more similar to renters and less similar to home owners. In this case, the transition probability between values "renter" and "lives with parents" can be higher than transition probability between values "lives with parents" and "owner." Accordingly, this can result in a decision tree that can more often consider a customer with value "lives with parents" as having a value "renter," and vice versa, and less often consider the customer as having the value "owner." Further, the transition probabilities may not need to be symmetric—for example, the value "lives with parents" can be considered similar to the value "renter" treatments, but the value "renter" may be considered completely different (that is, not similar) to the value "lives with parents."

Above, (1) addition of noise, and (2) random flipping of values of attributes using a transition probability table are described as separate implementations. However, when customers may be associated with both ordinal attributes (for example, risk score and credit line utilization) and categorical attributes (for example, gender and residential status) are used, the above-noted two methods (that is, (1) addition of noise, and (2) random flipping of values of attributes using a transition probability table) can be used in combination. The combination of these two methods can be either in any sequence or in parallel.

FIG. 8 is a table 800 illustrating offer eligibilities of a plurality of customers. These offer eligibilities can be used to impose limits/constraints during provision of offers to the customers so further improve/increase the business efficacy. The table 800 includes offers 802, such as first offer (A) 804, second offer (B) 806, and third offer (C) 808. The offers 800 can be for customers 810, such as X1, X2, X3, X4, and so on. The table 800 further includes treatment eligibility sets 812. The entries "1" can characterize eligible customer-offer combinations, and the entries "0" can characterize ineligible customer-offer combinations. The values of offer eligibility sets 812 can characterize offers 802 for which an associated customer may be eligible.

The offer eligibilities of table 800 can be determined as follows. For each value of an offer, customers can be determined that fall into a region, which can be associated with attributes "X" and where this value can be well represented. A conditional multinomial regression model can be implemented to predict the probability for each offer "k" as a function of the "X." That is, $pk(X)$=Probability{Offer=k|X}, wherein k=0, 1, 2, . . . . A customer with attributes "X" can be eligible for offer "k" if $pk(X)>c$, where "c" can be a probability threshold, such as zero point two (that is, 0.2). Otherwise, the customer can be ineligible for offer "k."

Figure 9:
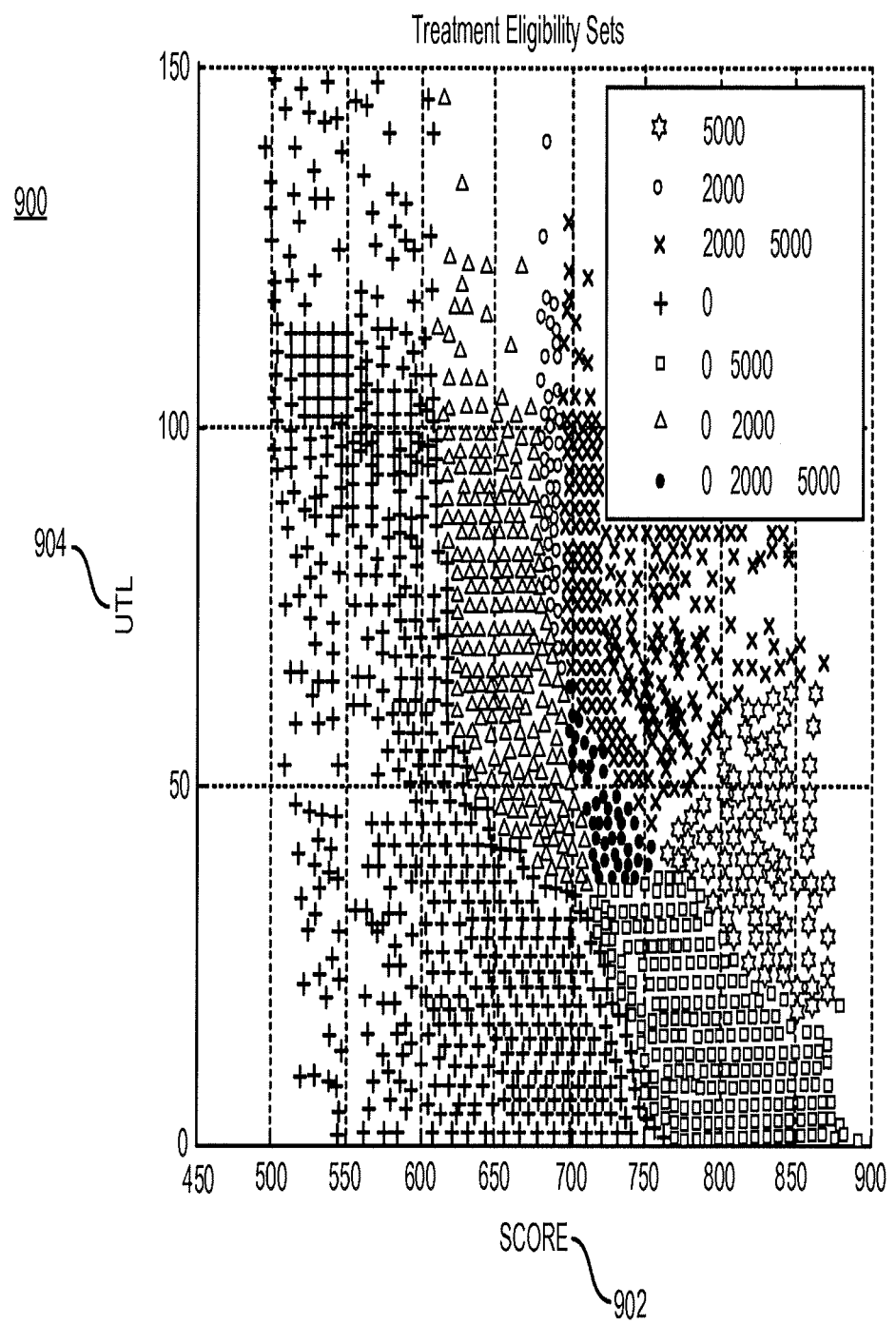
FIG. 9 is a plot illustrating an offer provided to each customer associated with attributes risk score and credit line utilization, after the offer eligibilities have been imposed to either provide or deny offers to corresponding customers.

FIG. 9 is a plot 900 illustrating an offer (for example, credit line increase (CLI)) provided to each customer that is associated with attributes risk score 902 and credit line utilization 904, after the offer eligibilities have been imposed to either provide or deny offers to corresponding customers. The associated probability threshold "c" can be zero point two (that is, 0.2). The offer eligibilities can be obtained from offer eligibility tables, such as table 800. The risk score 902 can be same as either risk score 302 or modified risk score 702. The credit line utilization 904 can be same as either credit line utilization 304 or modified credit line utilization 704. Each customer can be associated with one of seven non-empty offer eligibility sets, which can be differentiated by at least one of color and intensity of the illustrated dots, wherein each dot can characterizes a customer.

Figure 10:
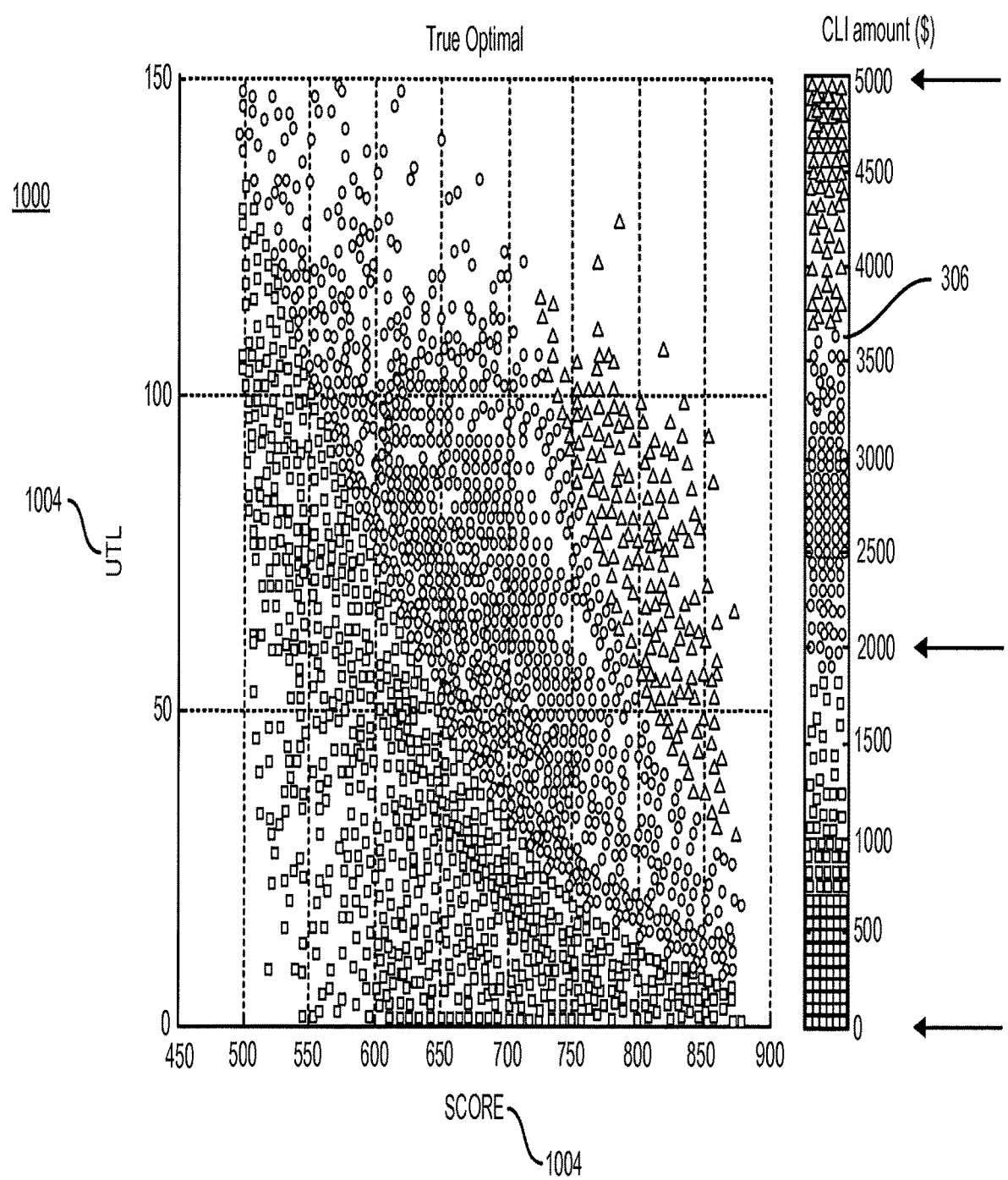
FIG. 10 is a plot illustrating an offer provided to each customer associated with attributes risk score and credit line utilization, in accordance with a true optimal strategy.

FIG. 10 is a plot 1000 illustrating an offer (for example, credit line increase (CLI)) provided to each customer that is associated with attributes risk score 1002 and credit line utilization 1004, in accordance with a true optimal strategy. This true optimal strategy can be based on a simulation model, and is shown here for comparison and benchmarking. The true optimal strategy can be even more optimal (for example, provide more business efficacy) than the initial champion strategy. The champion strategy can be obtained in a first iteration of flowchart 100, and in subsequent iterations, increasingly optimal strategies for providing offers can be obtained. After a threshold number of iterations, a most optimal strategy can be obtained. The risk score 1002 can be same as either risk score 302 or modified risk score 702. The credit line utilization 1004 can be same as either credit line utilization 304 or modified credit line utilization 704.

Figure 11:
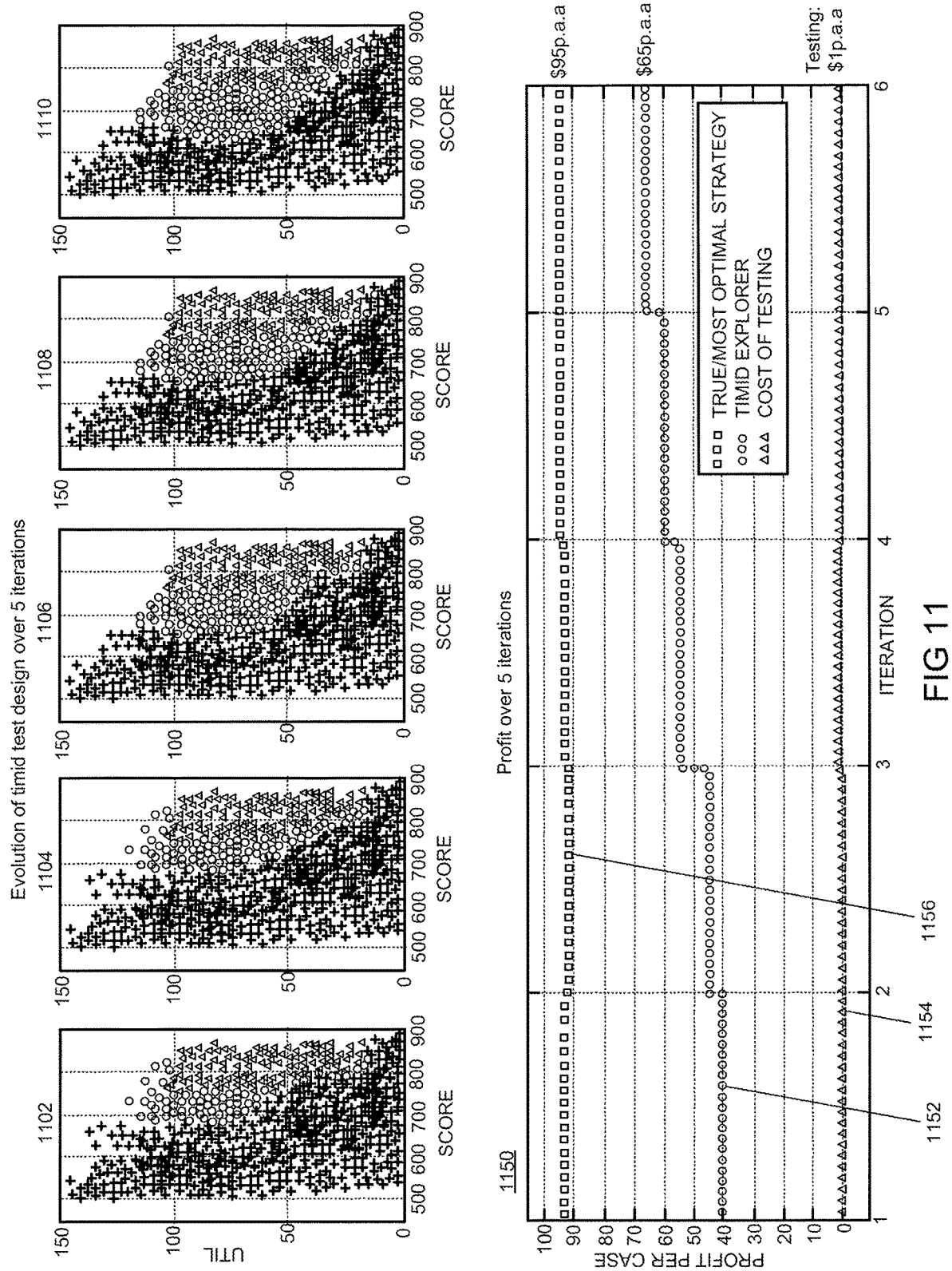
FIG. 11 is a diagram illustrating changes in strategies for providing offers and associated changes in business efficacy with different iterations of strategy optimization, in accordance with a timid testing/modeling technique.

FIG. 11 is a diagram illustrating changes in strategies for providing offers and associated changes in business efficacy (for example, profit of an entity providing offers) with different iterations of strategy optimization, in accordance with a timid testing/modeling technique. In the timid modeling technique, standard deviation of noise added (for example, addition of noise is described with respect to system 600) to attributes can be small. The initial strategy 1102 resembles the champion strategy, and subsequent changes from plot to plot (e.g. 1002 to 1004, 1004 to 1006, etc.) can be all small, because only a small fraction of customers located close to decision boundaries can receive alternate treatments, as there is a small common-support region.

The standard deviations can be fixed for all iterations. In other implementations, the standard deviation can vary in each iteration. For example, the standard deviation can either increase or decrease, either linearly or non-linearly, in a particular (for example, predetermined) fashion.

Further, a graph 1150 illustrates business efficacy over five iterations. The business efficacy can be characterized by profits and associated costs. Line 1152 illustrates profits (in units of dollars per customer account per year (p.p.a)) made by the test designs over five iterations. Line 1154 illustrates costs of testing, wherein cost of testing can characterize a comparison between expected profit from a champion strategy and expected profit from a current test design (for example, scattered plots 1102, 1104, 1106, 1108, and 1110) around the champion strategy. Line 1156 illustrates benchmark profits generated by the true optimal strategy. Lines 1152, 1154, and 1156 can have different corresponding colors and/or intensities for a clear visualization.

Figure 12:
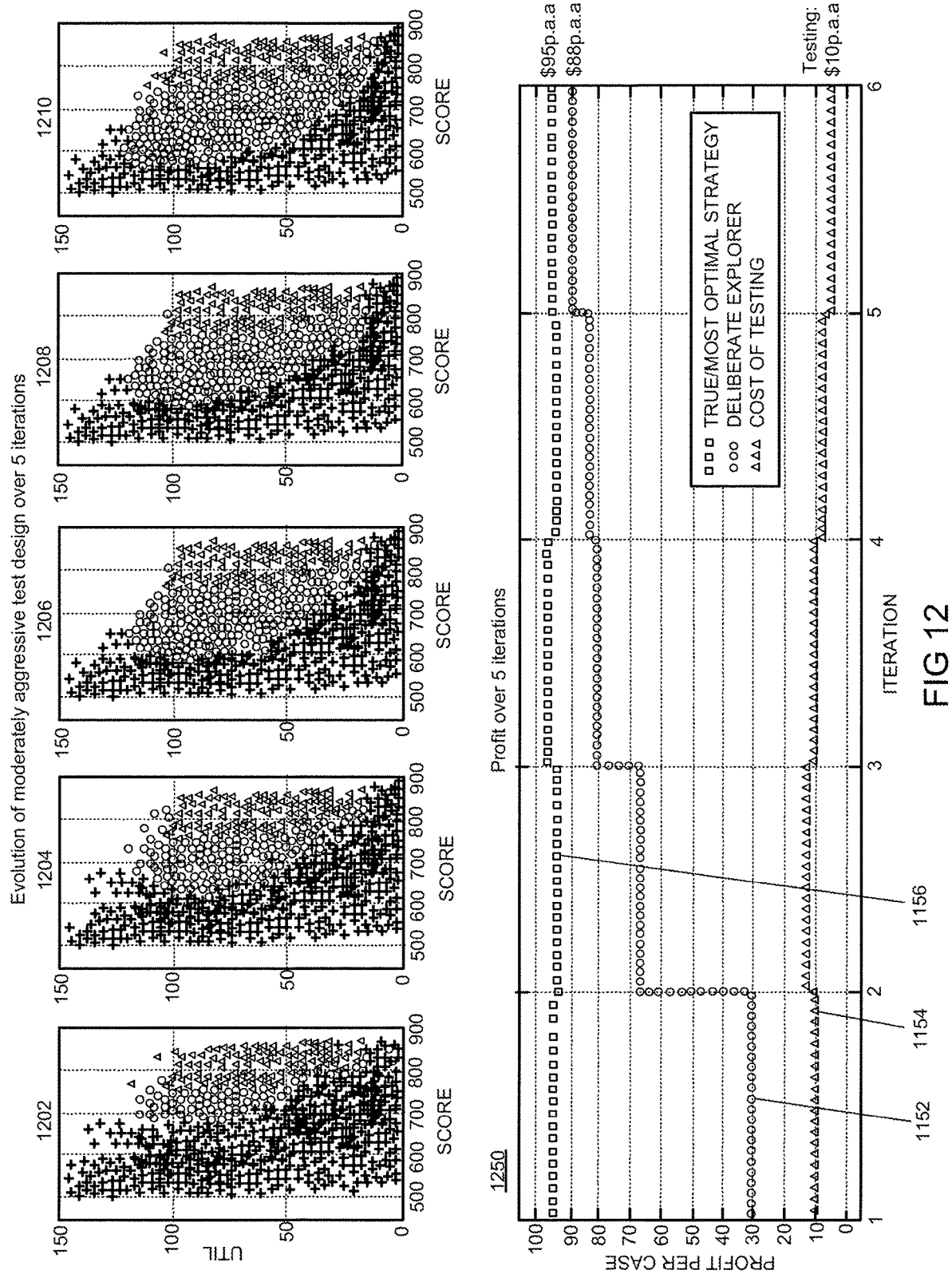
FIG. 12 is a diagram illustrating changes in strategies for providing offers and associated changes in business efficacy with different iterations of strategy optimization, in accordance with an aggressive testing/modeling technique.

FIG. 12 is a diagram illustrating changes in strategies for providing offers and associated changes in business efficacy (for example, profit of an entity providing offers) with different iterations of strategy optimization, in accordance with an aggressive testing/modeling technique. In the aggressive modeling technique, standard deviation of noise added (for example, addition of noise is described with respect to system 600) to attributes can be increased by large values. The initial plot 1202 in the first iteration can be significantly different from the plot 1102 and from the champion strategy, because a large fraction of customers located close to decision boundaries can receive alternate treatments, as there is a large common-support region.

The standard deviations can be fixed for all iterations. In other implementations, the standard deviation can vary in each iteration. For example, the standard deviation can either increase or decrease, either linearly or non-linearly, in a particular (for example, predetermined) fashion.

Further, a graph 1250 illustrates business efficacy (for example, profit of an entity providing offers) over five iterations.

The graphs 1150 and 1250 can be compared as follows. Initially, the timid test design can make a profit of $40 per account per customer account per annum (p.a.a.), which can be higher than the $30 p.a.a. profit made by the moderately aggressive test design. But after a small number of iterations, the moderately aggressive testing can make the higher profit. After five iterations, the moderately aggressive testing can makes a profit of $88 p.a.a. versus $66 p.a.a. for timid testing.

Cost of testing can characterize a comparison between expected profit from a champion strategy and expected profit from a current test design (for example, scattered plots 1102, 1104, 1106, 1108, 1110, 1202, 1204, 1206, 1208, and 1210, whichever is current and appropriate) around the champion strategy. For each iteration, costs of testing can also be evaluated by comparing the profit performance of the current champion strategy with the profit performance of the current test design. Costs of testing can be very small (for example, $1 p.p.a.) for timid testing, whereas the costs of testing can remain moderate (for example, $10 p.p.a. or less) for the moderately aggressive testing. Further, the cost of testing can shrink over time for the moderately aggressive test design, which can be partly due to the decreasing value of standard deviation over time. The profit figures shown for the test designs have been already accounted-for in the testing costs.

Thus, as noted above, standard deviation of the noise distribution associated with noise added to attributes can be increased to follow a more aggressive strategy. However, when the standard deviation is increased, the cost can increase, thereby decreasing the profit. Therefore, an optimal standard deviation is used such that the profit increases, as desired, in the iterations. Accordingly, very timid test designs can be rejected due to associated slow learning, and very aggressive test designs can be rejected due to associated high costs. To obtain a tradeoff (also referred to herein as an exploration-versus-exploitation-tradeoff) between aggressiveness (so as to learn as much and as fast as possible) and timidness (so as to keep testing costs under control), an evaluation system can be used that can display and determine the tradeoff.

Figure 13:
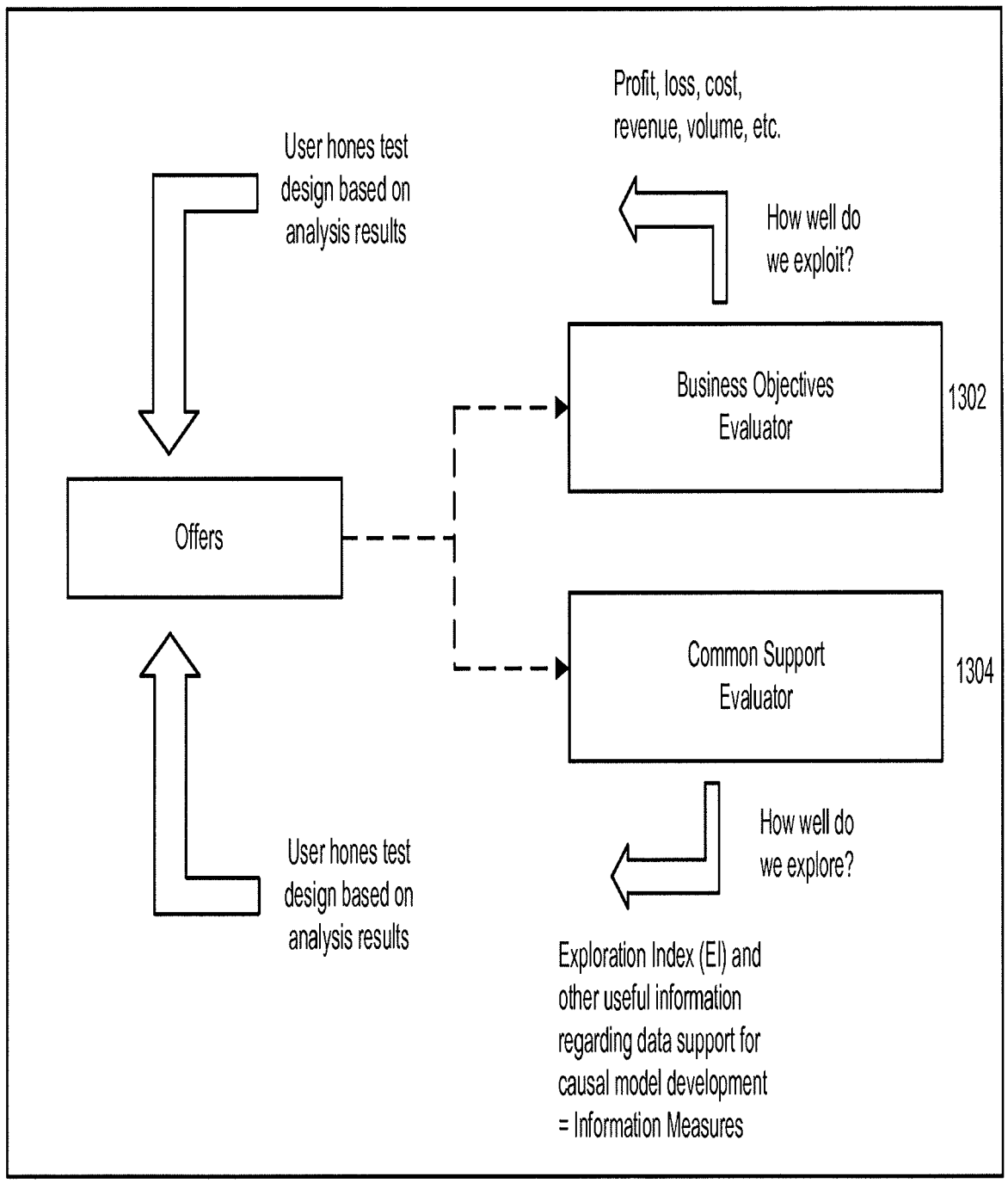
FIG. 13 is a diagram illustrating an evaluation system that can determine the exploration-versus-exploitation-tradeoff between aggressiveness and timidness.

FIG. 13 is a diagram illustrating an evaluation system 1300 that can determine the exploration-versus-exploitation-tradeoff between aggressiveness (so as to learn as much and as fast as possible) and timidness (so as to keep testing costs under control).

The evaluation system 1300 can include a business objectives evaluator 1302 that can determine an effectiveness of exploitation. To determine the effectiveness of exploitation, the business objective evaluator 1302 can determine metrics for exploitation, such as profit per customer as expected from a test design (for example, one of scatter plots 1102, 1104, 1106, 1108, 1110, 1202, 1204, 1206, 1208, and 1210, whichever is appropriate). While profit is described as a metric, other metrics can also be used, such as loss, cost, revenue, volume, and any other business exploitation metric.

The evaluation system 1300 can further include a common support evaluator 1304 that can determine an effectiveness of exploration. To determine the effectiveness of exploration, the common support evaluator 1304 can determine an exploration index (EI), which can characterize an extent of common support regions in scattered plots (for example, scatter plots 1102, 1104, 1106, 1108, 1110, 1202, 1204, 1206, 1208, 1210, and the like) of test designs. The exploration index and the common support regions can characterize amount of information captured in the test data for developing a causal model for determining effects of treatments on customers. Although an exploration index has been described, other information regarding data support for causal model development can also be used.

The exploration index can include a portion of customers associated with offer eligibility sets of cardinality greater than or equal to two. The offer eligibility sets can be offer eligibility sets 812 in table 800. In one variation, the exploration index can calculate a sum of cardinalities of treatment eligibility sets for all customers. Such a calculation can be advantageous for customers with larger eligibility sets, as more causal effects can be determined and used, due to presence of a larger dataset.

The exploration index can also be formed using different optimization criteria. For example, a parametric structure for quadratic causal models with first order interactions can be assumed. The parametric structure can specify a design matrix for a regression model. Then, a design optimality criterion, such as D-optimality, can be used. For the design optimality criterion, a determinant of the information matrix of the design can be calculated. The value of the determinant can be directly proportional to accuracy of estimation of the model parameters characterized by the exploration index.

The business metrics, as determined by the business objective evaluator 1302, and the exploration index, as determined by the common support evaluator 1304, can be used to find a balance (for example, exploration-versus-exploitation-tradeoff) between exploitation and exploration. Information associated with exploration-versus-exploitation-tradeoff can be used to determine offers that can be provided to customers. These offers can be used by the business objectives evaluator 1302 and the common support evaluator 1304 to re-determine the effectiveness of exploitation and exploration, and determine new offers that can be more optimal than previous offers.

Figure 14:
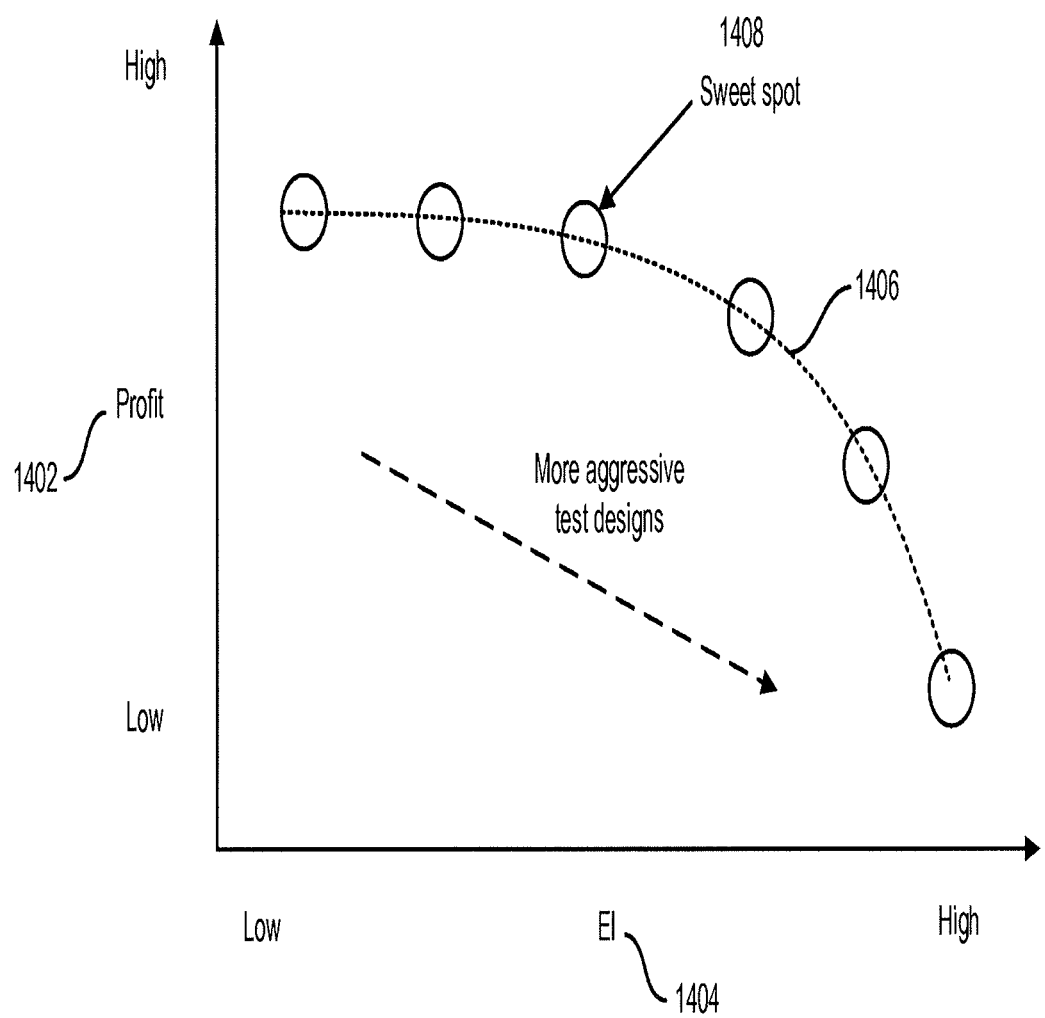
FIG. 14 is a diagram illustrating a graph that can be displayed to determine the exploration-versus-exploitation-tradeoff.

FIG. 14 is a diagram illustrating a graph 1400 that can be displayed to determine the exploration-versus-exploitation-tradeoff. The graph 1400 can include a plot of profit 1402 versus exploration index (EI) 1404. The profit 1402 can characterize exploitation, and the exploration index 1404 can characterize exploration. The graph 1400 can include a tradeoff curve 1406 that can be formed by varying standard deviation of noise added to attributes of a plot associated with a decision tree or strategy of providing offers.

A sweet spot 1408 can be determined on the tradeoff curve 1406. The sweet spot 1408 can characterize the exploration-versus-exploitation-tradeoff. The location of the sweet spot 1408 can be a position on the tradeoff curve 1406 where a substantial amount of information (as measured by the exploration index 1404) can be generated, while profit 1402 may not be substantially decreased. Thus, the sweet spot 1408 can characterize a position where generated strategy data can be more than a first threshold while profit can be more than a second threshold.

The term customer, as referred herein, can include a customer, an individual, an entity, a person, personnel, and/or the like. The term offer, as used herein, can include a discount, an allowance, a commission, a concession, an exemption, a coupon, a present, a time-share, a proposal, a presentation, cash, and/or any other offer. The term strategy, as used herein, can include a policy, a plan, an arrangement, intelligence, or any other strategy.

While two-dimensional graphs/plots have been described to show values for two attributes, other models can exist when there are more than two attributes. For example, when three attributes are used, three-dimensional models can be used; and when "n" attributes are used, n-dimensional models can be used.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
    obtaining, by at least one programmable processor, data associated with a plurality of individuals, one or more of the plurality of individuals associated with a plurality of attributes;
    determining, by at least one programmable processor and based on the obtained data, a plurality of possible offers for the plurality of individuals;
    determining, by at least one programmable processor and from the plurality of offers, a best offer for one or more of the plurality of attributes;
    forming, by at least one programmable processor, a decision model characterizing best offers for corresponding attributes using two or more causal models joined together, the decision model including a decision tree and a challenger decision tree;
    evaluating, using the decision model, one or more objectives of an entity, and determining, using the decision model, the best offer for one or more of the plurality of attributes;

comparing, by at least one programmable processor, performance of the decision tree with performance of the challenger decision tree to obtain a best performing decision tree, the challenger decision tree being obtained by changing values of some attributes associated with the decision tree and the best performing decision tree being determined as one of the decision tree or the challenger decision tree that performs better by providing a maximum business advantage or efficacy based on possible consequences as determined by the decision tree; and transmitting, by at least one programmable processor, offers to one or more of the plurality of individuals in accordance with the best performing decision tree for a threshold time period; and subsequent to the threshold time period elapsing, re-performing one or more of the obtaining of data associated with the one or more of the plurality of individuals associated with a plurality of attributes, the determining a plurality of possible offers for the plurality of individuals, the determining a best offer for one or more of the plurality of attributes, the forming of another decision tree characterizing best offers for corresponding attributes, the comparing performance of the another decision tree with the performance of another challenger decision tree to obtain another best performing decision tree, and the transmitting offers to one or more of the plurality of individuals in accordance with the another best performing decision tree.

2. The method of claim 1, wherein the causal models characterize a response of an individual to a historical offer.

3. The method of claim 1, wherein the determining of the best offer is based on evaluation of at least one of a global maximum value and a local maximum value by the decision tree.

4. The method of claim 1, wherein:
the performance of the decision tree is characterized by efficacy provided by implementing a strategy associated with the decision tree, the efficacy associated with the decision tree being based on a plurality of iterations of strategy evolution; and
the performance of the challenger decision tree is characterized by efficacy provided by implementing a strategy associated with the challenger decision tree, the efficacy associated with the challenger decision tree being based on a plurality of iterations of strategy evolution.

5. The method of claim 4, wherein the efficacy characterizes a profit of an entity providing the offers to the plurality of individuals.

6. The method of claim 1, wherein the plurality of attributes comprise observed variables known at time of provision of providing the offers, derived variables, predictive variables, and a score.

7. The method of claim 6, wherein the observed variables comprise: data filled by customers in applications, data associated with financial-accounts, demographics data, transaction data, credit bureau data, credit card score, credit card usage data, risk score, revenue score, credit line utilization data, social network data, conversations of one or more customers with one of other customers and third parties, and third party data.

8. The method of claim 6, wherein the inferred derived variables comprise: text keywords, n-grams, merger and acquisition transaction data, and parameters of social networks.

9. The method of claim 6, wherein the predictive variables comprise: likelihood to default over a predetermined period of time in future, and expected customer lifetime value.

10. The method of claim 6, wherein the score is calculated based on the observed variables.

11. The method of claim 1, wherein the plurality of offers comprise a plurality of increases in credit limits for each of one or more individuals of the plurality of individuals.

12. The method of claim 1, wherein:
each decision tree is one of a graph or a model that characterizes decisions and possible consequences; and
the consequences comprise one or more of: chance outcomes, resource costs, and efficacy.

13. A system comprising:
at least one data processor; and
memory storing instructions which, when executed by the at least one data processor, result in operations comprising:
obtaining data associated with a plurality of individuals, each individual associated with a plurality of attributes;
determining, based on the obtained data, a plurality of possible offers for the plurality of individuals, the offer being associated with whether an individual from among the plurality of individuals qualifies for a credit line increase;
determining, from the plurality of offers, a best offer for each attribute, the best offer for each attribute being an offer that provides more efficacy than other offers associated with the attribute;
using two or more causal models joined together, forming a decision model characterizing best offers for corresponding attributes, the decision model comprising a decision tree and a challenger decision tree;
evaluating, using the decision model, one or more objectives of an entity, and
determining, using the decision model, the best offer for one or more of the plurality of attributes;
obtaining -a the challenger decision tree by changing values of some attributes associated with the decision tree;
comparing performance of the decision tree with performance of the challenger decision tree to obtain a best performing decision tree, the best performing decision tree being one of the decision tree and the challenger decision tree that performs better by providing a maximum business advantage or efficacy for the decision tree; and
providing offers to the plurality of individuals in accordance with the best performing decision tree for a threshold time period;
subsequent to the threshold time period elapsing, re-performing one or more of the obtaining of data associated with the one or more of the plurality of individuals associated with a plurality of attributes, the determining a plurality of possible offers for the plurality of individuals, the determining a best offer for one or more of the plurality of attributes, the forming of another decision tree characterizing best offers for corresponding attributes, the comparing performance of the another decision tree with the performance of another challenger decision tree to obtain another best performing decision tree, and the transmitting offers to one or more of the plurality of individuals in accordance with the another best performing decision tree;

assigning one or more of the plurality of individuals to one of the decision tree and the challenger decision tree, the plurality of attributes associated with the plurality of individuals including a risk score and a credit line utilization, wherein the assigning the one or more of the plurality of individuals to one of the decision tree and the challenger decision tree produces at least one common support region characterized by including individuals of the plurality of individuals that qualify for different levels of credit line increase based on the plurality of attributes including the risk score and the credit line utilization; and extending alternative offers, based on one of the decision tree and the challenger decision tree, to the plurality of individuals in the at least one common support region.

14. The system of claim 13, wherein:

the decision tree is one of a graph or a model that characterizes decisions and possible consequences; and the consequences comprise one or more of: chance outcomes, resource costs, and efficacy.

15. A non-transitory computer program product storing instructions which, when executed by at least one data processor forming part of at least one computing system, result in operations comprising:

obtaining data associated with a plurality of individuals, each individual associated with a plurality of attributes;

determining, based on the obtained data, a plurality of possible offers for the plurality of individuals, the offer being associated with whether an individual from among the plurality of individuals qualifies for a credit line increase;

determining, from the plurality of offers, a best offer for each attribute, the best offer for each attribute being an offer that provides more efficacy than other offers associated with the attribute;

using two or more causal models joined together, forming a decision model, characterizing best offers for corresponding attributes, the decision model including a decision tree, the decision tree being a decision graph;

determining, using the decision model, one or more objectives of an entity, and determining, using the decision model, the best offer for one or more of the plurality of attributes;

comparing performance of the decision graph with performance of a challenger decision graph to obtain a best performing decision graph, the challenger decision graph being obtained by changing values of one or more attributes associated with the decision graph, the best performing decision graph being determined as at least one of the decision graph and the challenger decision graph that performs better by providing a maximum business advantage or efficacy based on possible consequences as determined by the decision model; and providing offers to the plurality of individuals in accordance with the best performing decision graph for a threshold time period; and subsequent to the threshold time period elapsing, re-performing one or more of the obtaining of data associated with the one or more of the plurality of individuals associated with a plurality of attributes, the determining a plurality of possible offers for the plurality of individuals, the determining a best offer for one or more of the plurality of attributes, the forming of another decision tree characterizing best offers for corresponding attributes, the comparing performance of the another decision tree with the performance of another challenger decision tree to obtain another best performing decision tree, and the transmitting offers to one or more of the plurality of individuals in accordance with the another best performing decision tree.

* * * * *